US012674937B2

(12) United States Patent
Yu

(10) Patent No.: US 12,674,937 B2
(45) Date of Patent: Jul. 7, 2026

(54) EFFICIENT PHOTONIC COUPLERS FOR PHOTONIC WAVEGUIDES AND METHODS OF FORMING THE SAME

(71) Applicant: Taiwan Semiconductor Manufacturing Company Limited, Hsinchu (TW)

(72) Inventor: Chen-Hua Yu, Hsinchu City (TW)

(73) Assignee: Taiwan Semiconductor Manufacturing Company Limited, Hsinchu (TW)

( * ) Notice: Subject to any disclaimer, the term of this patent is extended or adjusted under 35 U.S.C. 154(b) by 282 days.

(21) Appl. No.: 18/402,034

(22) Filed: Jan. 2, 2024

(65) Prior Publication Data

US 2025/0208351 A1     Jun. 26, 2025

Related U.S. Application Data

(60) Provisional application No. 63/613,074, filed on Dec. 21, 2023.

(51) Int. Cl.
*G02B 6/30*          (2006.01)
*G02B 6/26*          (2006.01)

(52) U.S. Cl.
CPC ................ *G02B 6/30* (2013.01); *G02B 6/262* (2013.01)

(58) Field of Classification Search
None
See application file for complete search history.

(56) References Cited

U.S. PATENT DOCUMENTS 6,642,068 B1 * 11/2003 Hayes ...................... G02B 6/32
                                                          438/24
10,488,602 B2 * 11/2019 Evans ...................... G02B 6/32
(Continued)

FOREIGN PATENT DOCUMENTS

CN          1875304 A     12/2006
CN        104995538 A     10/2015
(Continued)

OTHER PUBLICATIONS

TW Patent and Trademark Office; TW Application No. 113105639; Office Action mailed May 28, 2025; 26 pages.

*Primary Examiner* — Jerry Rahll
(74) *Attorney, Agent, or Firm* — The Marbury Law Group, PLLC

(57) ABSTRACT

An embodiment photonic device may include a dielectric waveguide having a core portion, a cladding portion, and a first photonic coupler. The first photonic coupler may include a first dielectric pillar formed at a first surface of the cladding portion and optically coupled to the core portion, and a first dielectric cap optically coupled to the first dielectric pillar. Each of the first dielectric pillar and the first dielectric cap may include a polymer material that is transparent to infrared radiation such that radiation incident on the first dielectric cap from the core portion is focused by the first dielectric cap to a beam width that is smaller than a width of the core portion of the dielectric waveguide. Some embodiments may include a second photonic coupler having a second dielectric pillar optically coupled to the core portion, and a second dielectric cap optically coupled to the second dielectric pillar.

20 Claims, 15 Drawing Sheets

(56) References Cited

U.S. PATENT DOCUMENTS

| 2003/0198439 | A1* | 10/2003 | Hiramatsu | G02B 6/122 |
| | | | | 385/39 |
| 2005/0058399 | A1 | 3/2005 | Nishizawa et al. | |
| 2010/0322551 | A1* | 12/2010 | Budd | G02B 6/4206 |
| | | | | 438/31 |
| 2017/0146751 | A1* | 5/2017 | Sutherland | G02B 6/4214 |
| 2019/0219759 | A1* | 7/2019 | Tsudome | G02B 6/021 |
| 2020/0386945 | A1* | 12/2020 | Kizhner | G02B 6/262 |

FOREIGN PATENT DOCUMENTS

| JP | 2003172837 A | 6/2003 |
| TW | I230812 B | 4/2005 |

* cited by examiner

200c

700

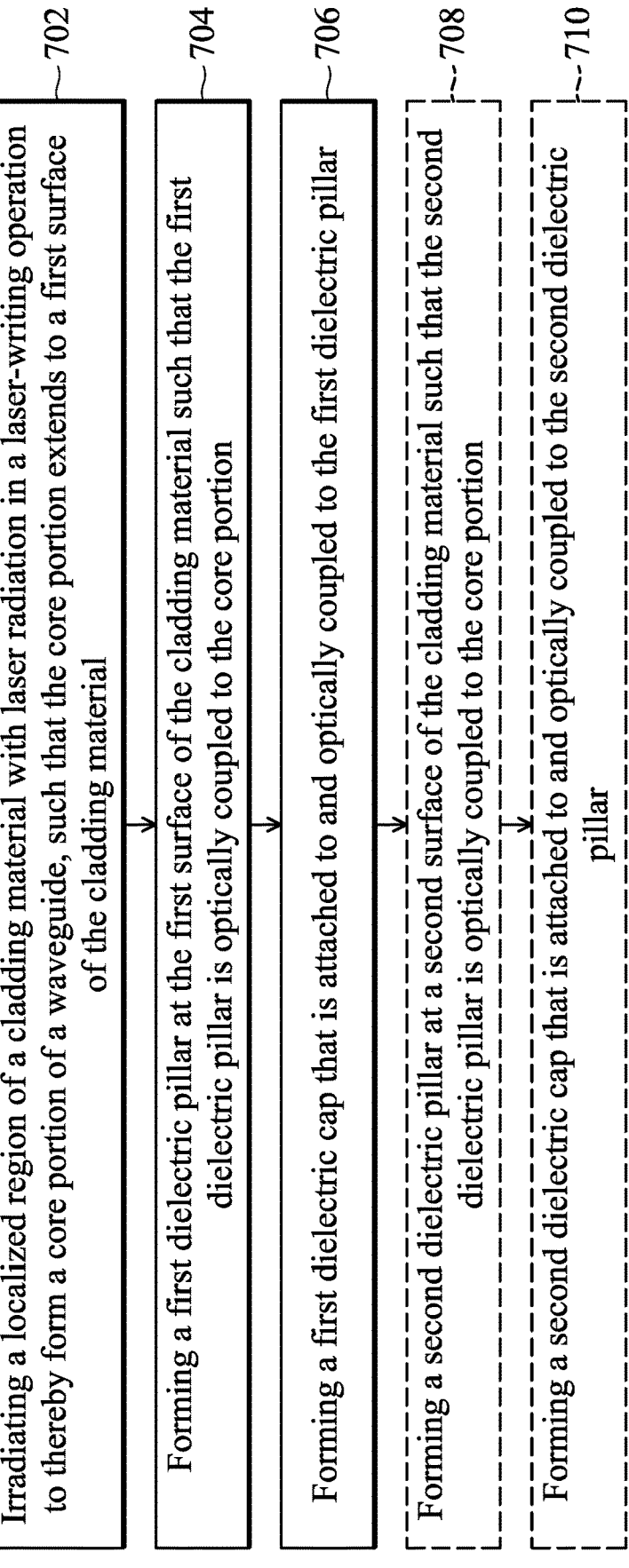

Irradiating a localized region of a cladding material with laser radiation in a laser-writing operation to thereby form a core portion of a waveguide, such that the core portion extends to a first surface of the cladding material — 702

Forming a first dielectric pillar at the first surface of the cladding material such that the first dielectric pillar is optically coupled to the core portion — 704

Forming a first dielectric cap that is attached to and optically coupled to the first dielectric pillar — 706

Forming a second dielectric pillar at a second surface of the cladding material such that the second dielectric pillar is optically coupled to the core portion — 708

Forming a second dielectric cap that is attached to and optically coupled to the second dielectric pillar — 710

FIG. 7

EFFICIENT PHOTONIC COUPLERS FOR PHOTONIC WAVEGUIDES AND METHODS OF FORMING THE SAME

RELATED APPLICATIONS

This application claims the benefit of priority from U.S. Provisional Application Ser. No. 63/613,074, entitled "Efficient Photonic Couplers For Photonic Waveguides And Methods Of Forming The Same," filed on Dec. 21, 2023, the entire contents of which is incorporated herein by reference for all purposes.

BACKGROUND

Many computing applications use optical (i.e., photonic) signals to provide secure high-speed data transmission. Various emerging technologies are also being developed that may provide functionality to perform computing operations directly on optical/photonic signals. Silicon photonics is a promising technology area that uses semiconductor device processing techniques to provide systems including integrated electronic and photonic components. Such components may be used for the generation, routing, modulation, processing, and detection of light. Together, these functions form an optical analog to electronic integrated circuits (EIC) and, as such, may constitute photonic integrated circuits (PIC).

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 7 is a flowchart illustrating operations of a method of forming a photonic device, according to various embodiments.

DETAILED DESCRIPTION

Figure 1:
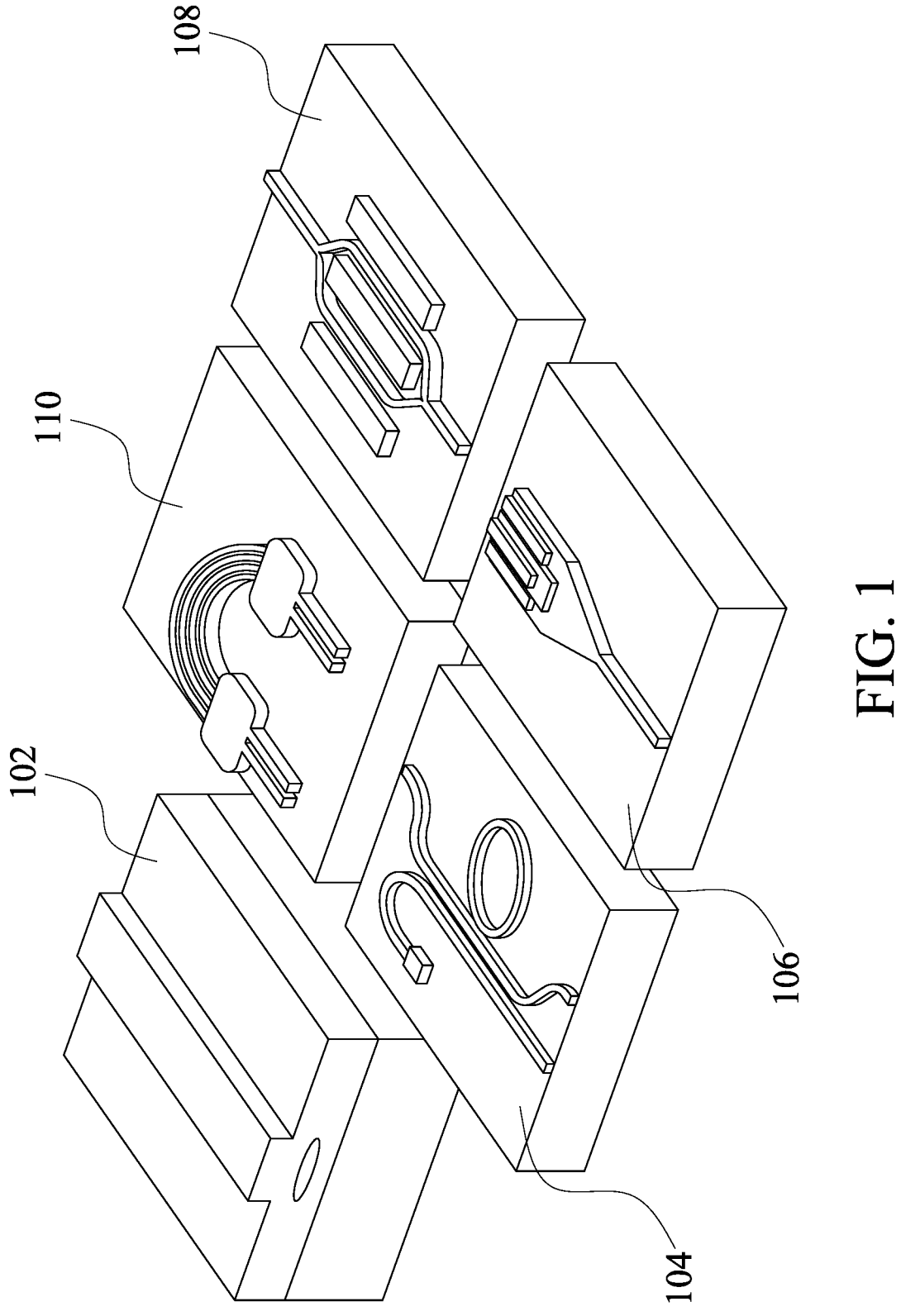
FIG. 1 is a schematic illustration of various components that may be used in a photonic computing system.

The following disclosure provides many different embodiments, or examples, for implementing unique features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. Unless explicitly stated otherwise, each element having the same reference numeral is presumed to have the same material composition and to have a thickness within a same thickness range.

Embodiment photonic devices may be advantageous by providing dielectric waveguides having photonic couplers that each receive incident radiation propagating within a respective dielectric waveguide and generate transmitted radiation that is focused in a region external to the dielectric waveguide. The focused transmitted radiation may be more efficiently received by a receiving optical component, such as an optical fiber, because the focused transmitted radiation may generally spread (i.e., diverge) more gradually with distance than unfocused radiation. As such, embodiment photonic devices that include the embodiment photonic couplers may exhibit improved coupling efficiency and reduced alignment and positioning tolerances relative to photonic devices that omit such photonic couplers. Such photonic couplers may thereby allow formation of photonic integrated circuits having an increased integration density and may provide smaller devices with reduced optical insertion loss relative to systems that omit the embodiment photonic couplers.

An embodiment photonic device may include a dielectric waveguide having a core portion, a cladding portion, and a first photonic coupler. The first photonic coupler may include a first dielectric pillar formed at a first surface of the cladding portion and may be optically coupled to the core portion. The first photonic coupler may also include a first dielectric cap optically coupled to the first dielectric pillar. Each of the first dielectric pillar and the first dielectric cap may include a polymer material that is transparent to infrared radiation such that radiation incident on the first dielectric cap from the core portion is focused by the first dielectric cap to a beam width that is smaller than a width of the core portion of the dielectric waveguide. Some embodiments may include a second photonic coupler having a second dielectric pillar optically coupled to the core portion, and a second dielectric cap optically coupled to the second dielectric pillar.

A further embodiment photonic device may include a plurality of dielectric waveguides each including a core portion, formed in a cladding material, and a plurality of photonic couplers. Each of the plurality of photonic couplers may include a dielectric pillar formed at a surface of the cladding material and optically coupled to the core portion, and a dielectric cap attached to and optically coupled to the dielectric pillar. Each of the dielectric pillar and the dielectric cap may include a polymer material that is transparent to infrared radiation, such that radiation incident on the dielectric cap from each waveguide is focused by the dielectric cap to a beam width that is smaller than a width of the core portion of the waveguide. In some embodiments, the plurality of dielectric waveguides may be formed as part of a planar lightwave circuit such that the plurality of dielectric waveguides includes a fan-out configuration, and in still further embodiments the plurality of dielectric waveguides may be arranged in a three-dimensional configuration within the cladding material.

An embodiment method of forming a photonic device may include irradiating a region of a cladding material with laser radiation in a laser-writing operation to thereby form a core portion of a waveguide, such that the core portion extends to a first surface of the cladding material. The method may further include forming a first dielectric pillar at the first surface of the cladding material such that the first dielectric pillar is optically coupled to the core portion, and forming a first dielectric cap that is attached to and optically coupled to the first dielectric pillar. In forming the first dielectric pillar, the method may further include forming a layer of a radiation-curable polymer over the first surface of the cladding material such that the radiation-curable polymer is formed in contact with a core surface of the core portion. The method may further include irradiating the radiation-curable polymer in a localized region over the first surface of the cladding material to thereby form the first dielectric pillar having a cured region of the radiation-curable polymer. In forming the first dielectric cap, the method may further include forming a portion of the radiation-curable polymer over the first dielectric pillar and irradiating the portion of the radiation-curable polymer to thereby form the first dielectric cap.

FIG. 1 is an illustration of various components that may be used in a photonic computing system. System components may include a generation device also referred to as a photonic source 102 such as a laser or light-emitting diode (LED), a routing device that may include a plurality of waveguides 104 configured to route optical signals, and a detector that includes one or more optical/photonic detectors 106 configured to detect optical/photonic signals and to convert received optical/photonic signals into output electrical signals. Additional components may include a modulation device that includes one or more optical modulators 108 and photonic processing components 110.

The one or more optical modulators 108 may be configured to impose an amplitude and/or phase modulation on an input optical signal generated by the photonic source 102. The photonic processing components 110 may be configured to perform logic operations on the modulated optical signal. The one or more optical modulators 108 may take an input electronic signal and modulate the input optical signal to impose an amplitude and/or phase modulation in response to the input electronic signal. In this way, the one or more optical modulators 108 may be used to convert data provided in the form of an electronic signal into data encoded as a photonic signal. Similarly, the one or more optical detectors 106 may convert processed photonic signals back into output electrical signals.

Figure 2A:
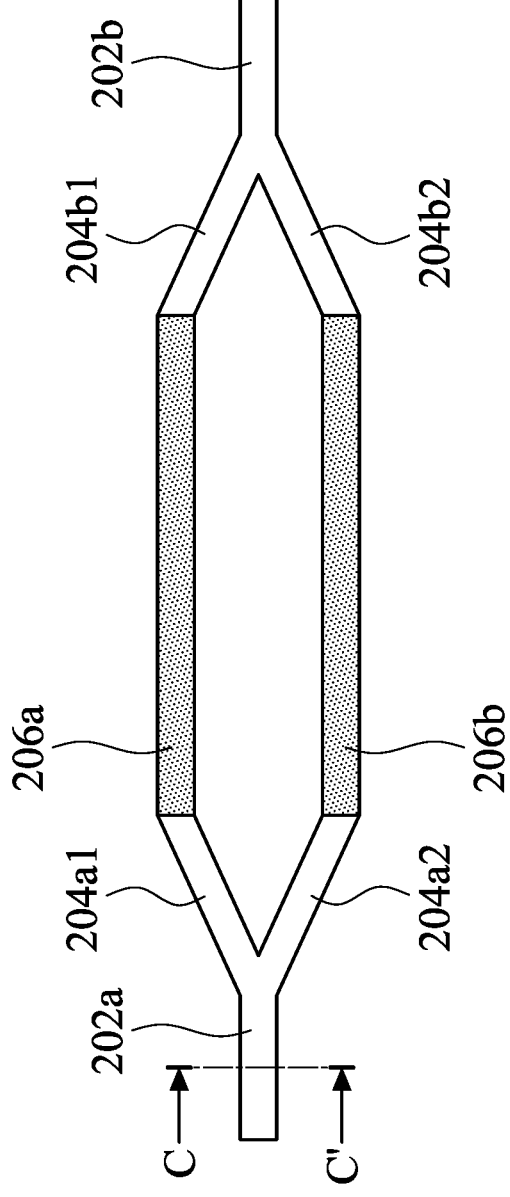
FIG. 2A is a top view of an electro-optic modulator that may be used in a photonic computing system.

FIG. 2A is a top view of an electro-optic modulator 200a that may be used in a photonic computing system. The cross-section C-C' indicates a vertical plane defining the vertical cross-sectional view shown in FIG. 2C. The electro-optic modulator 200a may include an input waveguide 202a and an output waveguide 202b. The input waveguide 202a may be configured to receive an input optical signal and the output waveguide 202b may be configured to provide an output optical signal that is a modulated version of the input optical signal. As shown, the input waveguide 202a may branch into a first waveguide segment 204a1 and a second waveguide segment 204a2. As such, the input waveguide 202a, the first waveguide segment 204a1, and the second waveguide segment 204a2 may function as a beam splitter.

An input signal received by the input waveguide 202a may be split into two optical signals (i.e., two copies of the input optical signal) that may be carried by the first waveguide segment 204a1 and the second waveguide segment 204a2, respectively. A first optical signal carried by the first waveguide segment 204a1 may be provided to a first modulator portion 206a and a second optical signal carried by the second waveguide segment 204a2 may be provided to a second modulator portion 206b. The first modulator portion 206a and the second modulator portion 206b may modify an amplitude and/or a phase of the respective first optical signal and the second optical signal.

The modified first optical signal transmitted along a third waveguide segment 204b1 and the modified second optical signal transmitted along a fourth waveguide segment 204b2 may then be combined to form an output optical signal that is provided to the output waveguide 202b. In this regard, the third waveguide segment 204b1 may be optically coupled to the first modulator portion 206a and the fourth waveguide segment 204b2 may be optically coupled to the second modulator portion 206b. In turn, the third waveguide segment 204b1 and the fourth waveguide segment 204b2 may be optically coupled to the output waveguide 202b. As such, the third waveguide segment 204b1, the fourth waveguide segment 204b2, and the output waveguide 202b may function as a beam combiner.

The first modulator portion 206a and the second modulator portion 206b may each modulate the respective first optical signal and the second optical signal according to an electro-optic effect. In this regard, the first modulator portion 206a and the second modulator portion 206b may each include a material having electro-optic properties. Such an electro-optic material may have optical properties (e.g., index of refraction and absorption coefficient) that may vary as a function of an applied electrical bias (i.e., voltage difference).

Figure 2B:
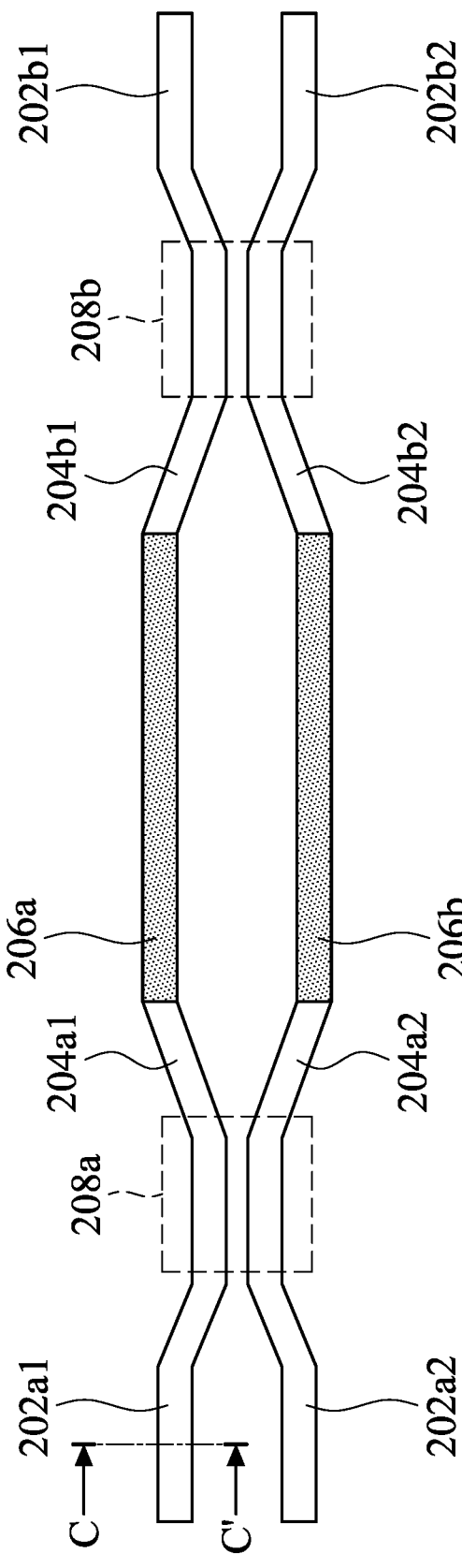
FIG. 2B is a top view of an optical switch that may be used in a photonic computing system.

FIG. 2B is a top view of an optical switch 200b that may be used in a photonic computing system. The cross-section C-C' indicates a vertical plane defining the vertical cross-sectional view shown in FIG. 2C. The optical switch 200b may include a first input waveguide 202a1, a second input waveguide 202a2, a first output waveguide 202b1, and a second output waveguide 202b2. Each of the first input waveguide 202a1, the second input waveguide 202a2, the first output waveguide 202b1, and the second output waveguide 202b2 may be configured to support single mode or multimode optical beams carrying optical signals.

In an example embodiment, the optical switch 200b may be implemented as a Mach-Zehnder interferometer integrated with a first 50/50 beam splitter 208a and a second 50/50 beam splitter 208b. As shown in FIG. 2B, each of the first input waveguide 202a1 and the second input waveguide 202a2 may be optically coupled to the first 50/50 beam splitter 208a (also referred to as a directional coupler). The first 50/50 beam splitter 208a may receive a first optical signal from the first input waveguide 202a1 and a second input signal from the second input waveguide 202a2.

Through the phenomena of evanescent coupling, a first 50% of the first optical signal may be directed into the first waveguide segment 204a1 and a second 50% of the first optical signal may be directed to the second waveguide segment 204a2. Concurrently, a first 50% of the second optical signal may be directed into the first waveguide segment 204a1 and a second 50% of the second optical signal may be directed to the second waveguide segment 204a2. In this regard, the first optical signal and the second optical signal may be evenly split between the first waveguide segment 204a1 and the second waveguide segment 204a2.

The first modulator portion 206a and the second modulator portion 206b may receive signals from the first waveguide segment 204a1 and the second waveguide segment 204a2, respectively, and may act to adjust amplitudes and/or phases of the received signals. In this regard, each of the first modulator portion 206a and the second modulator portion 206b may include an electro-optic material having optical properties (e.g., index of refraction and absorption coefficient) that may vary as a function of an applied electrical bias. As such, in certain embodiments, phases of optical signals propagating with the first modulator portion 206a and the second modulator portion 206b may be controllably varied through application of pre-determined bias potentials.

After propagation through the first 50/50 beam splitter 208a, signals propagating in the first waveguide segment 204a1 and the second waveguide segment 204a2 may have a well-defined phase relationship (e.g., in-phase, 180° out-of-phase, etc.) relative to one another. As such, the first modulator portion 206a and the second modulator portion 206b may introduce a pre-determined phase difference between signals respectively received from the first waveguide segment 204a1 and the second waveguide segment 204a2. Signals propagating through the first modulator portion 206a may then be provided as output to a third waveguide segment 204b1 and signals propagating through the second modulator portion 206b may be provided as output to a fourth waveguide segment 204b2. Respective signals received from the third waveguide segment 204b1 and the fourth waveguide segment 204b2 may then be provided to the second 50/50 beam splitter 208b.

The second 50/50 beam splitter 208b may then act to send a first 50% of the signal received from the third waveguide segment 204b1 to the first output waveguide 202b1 and a second 50% of the signal received from the third waveguide segment 204b1 to the second output waveguide 202b2. Concurrently, a first 50% of the signal received from the fourth waveguide segment 204b2 may be sent to the first output waveguide 202b1 and a second 50% of the signal received from the fourth waveguide segment 204b2 may be sent to the second output waveguide 202b2.

The relative phase between the signals propagating in the third waveguide segment 204b1 and the fourth waveguide segment 204b2 may determine what signals appear in the first output waveguide 202b1 and the second output waveguide 202b2. Due to the phenomena of constructive and destructive interference, signals may be switched such that a signal only appears in the first output waveguide 202b1 (e.g., light beams may be in-phase) or in second output waveguide 202b2 (e.g., light beams may be out of phase). As such, by applying certain predetermined bias voltages to the first modulator portion 206a and the second modulator portion 206b, the optical switch 200b may provide switch functionality in that optical signals may be directed to either the first output waveguide 202b1 or to the second output waveguide 202b2 as a function of bias voltages applied to the first modulator portion 206a and the second modulator portion 206b.

Although both arms of the optical switch 200b (configured as a Mach-Zehnder interferometer in this example embodiment) are illustrated as including phase adjustment sections (i.e., the first modulator portion 206a and the second modulator portion 206b) other embodiments may include an optical switch 200b having a phase adjustment device in only a single arm.

Although a Mach-Zehnder interferometer implementation is illustrated in FIG. 2B as the optical switch 200b, embodiments may not be limited to this particular switch architecture. Various other phase adjustment devices may be included within the scope of this disclosure, including ring resonator designs, Mach-Zehnder modulators, generalized Mach-Zehnder modulators, etc. In some embodiments, optical phase shifter devices described herein may be utilized within a quantum computing system. Alternatively, such optical phase shifter devices may be used in other types of optical systems. For example, other computational, communication, and/or technological systems may utilize photonic phase shifters to direct optical signals (e.g., single photons or continuous wave (CW) optical signals) within a system or network, and phase shifter architectures described herein may be used within these systems, in various embodiments.

Figure 2C:
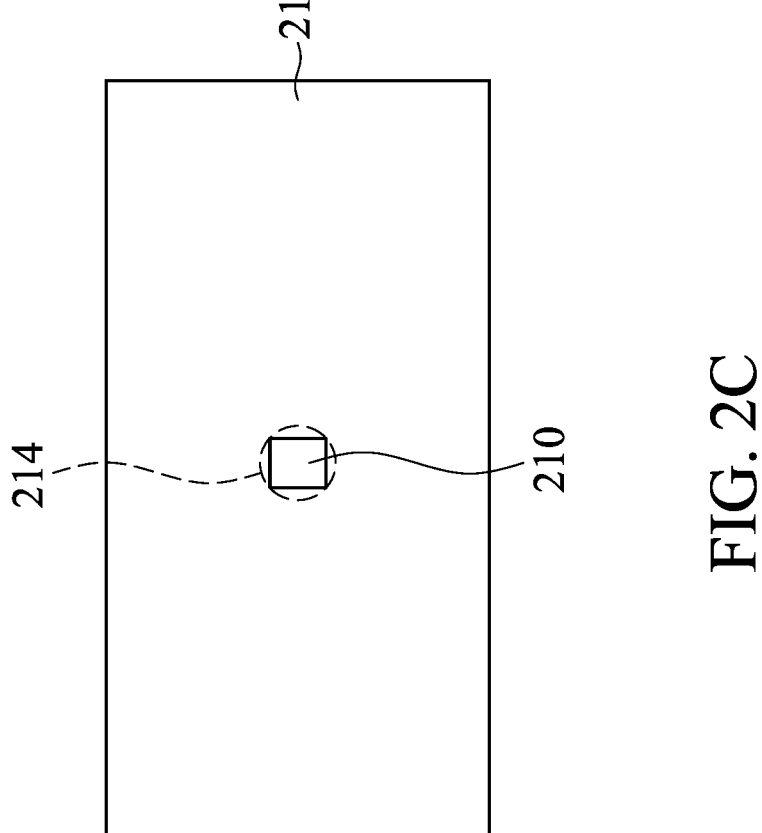
FIG. 2C is a vertical cross-sectional view of a dielectric waveguide along a vertical plane C-C' in FIGS. 2A and 2B.

FIG. 2C is a vertical cross-sectional view of a dielectric (e.g., silicon/SiO$_2$) waveguide 200c. As mentioned above, the vertical plane defining the view illustrated in FIG. 2C is indicated by the cross-section C-C' in FIGS. 2A and 2B. The dielectric waveguide 200c may include a core portion 210 and a cladding portion 212. The core portion 210 and the cladding portion 212 may each be configured to be transparent to light of a particular wavelength (e.g., infrared radiation). The core portion 210 and the cladding portion 212 may be formed using semiconductor device fabrication processes, as described in greater detail below.

The core portion 210 may be configured to have a higher index of refraction than that of the cladding portion 212. For example, the core portion 210 may be formed of doped or undoped silicon (e.g., index of refraction 3.88) and the cladding portion 212 may be formed of silicon oxide (e.g., index of refraction 1.46). Light may preferentially propagate in the core portion 210 due to the phenomena of total internal reflection resulting from the higher index of refraction of the core portion 210 relative to the cladding portion 212. For example, an optical mode may propagate within the core portion 210 and may have an electric field distribution that is confined to a localized region 214 associated with the core portion 210. The specific shape of the core portion 210 shown in FIG. 2C is merely an example and the core portion 210 may have various other shapes in other applications.

Figure 3A:
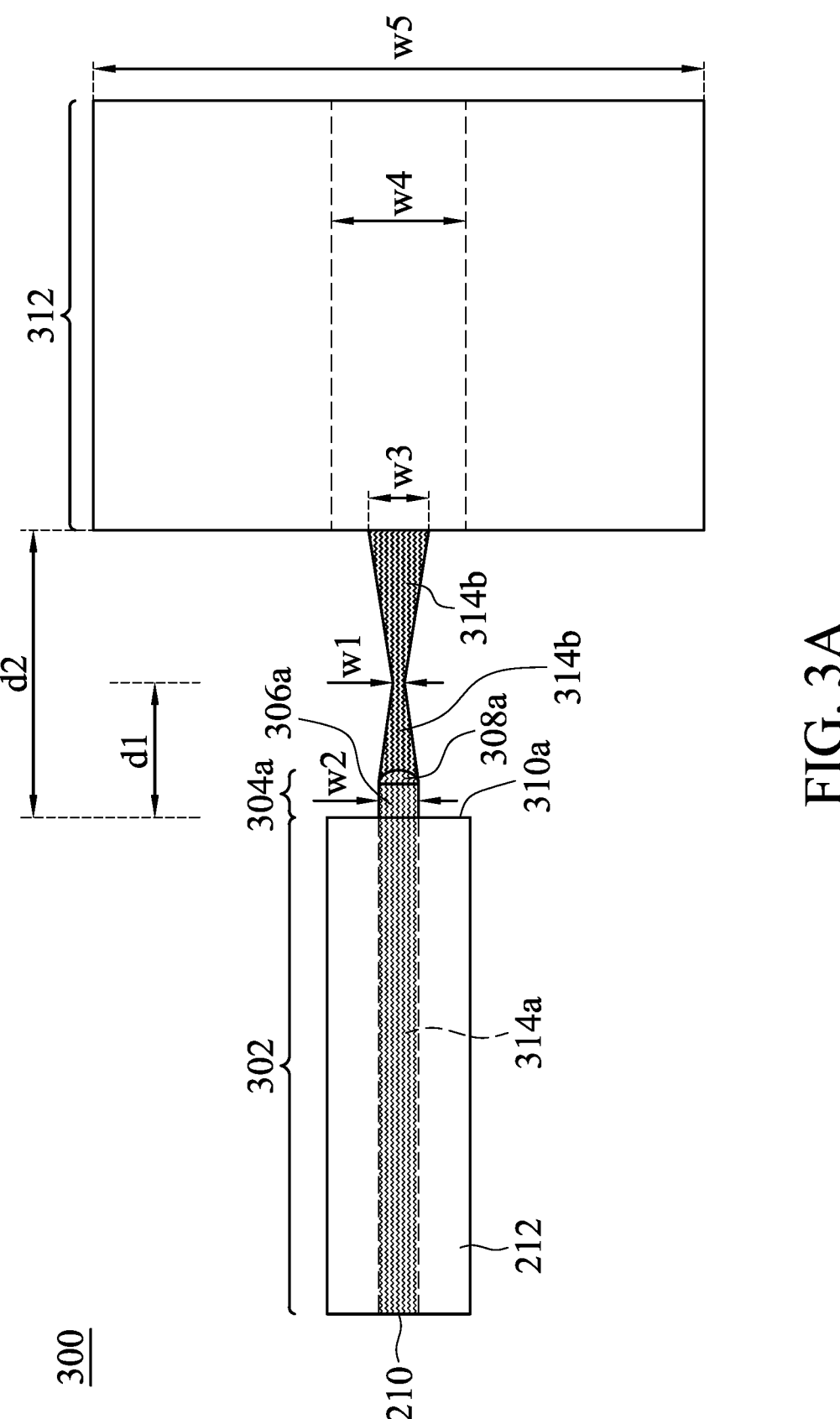
FIG. 3A is a side view of a photonic device including a dielectric waveguide and a photonic coupler, according to various embodiments.

FIG. 3A is a side view of a photonic device 300 including a dielectric waveguide 302 and a first photonic coupler 304a, according to various embodiments. As with previously-described examples, the dielectric waveguide 302 may include a core portion 210 embedded within a cladding portion 212. In contrast to previous examples, however, the photonic device 300 may further include the first photonic coupler 304a, which may include a first dielectric pillar 306a, formed at a first surface 310a of the cladding portion 212, and a first dielectric cap 308a. The first dielectric pillar 306a may be configured to be optically coupled to the core portion 210 and the first dielectric cap 308a may be attached to, and optically coupled to, the first dielectric pillar 306a.

As with other examples described above, the core portion 210 may include a first material having a first index of refraction and the cladding portion 212 may include a second material having a second index of refraction that is less than the first index of refraction. For example, the core portion 210 may include doped or undoped silicon and the cladding portion 212 may include silicon dioxide. Alternatively, the cladding portion 212 may be a glass or polymer material and the core portion 210 may be a modified material generated by performing a laser writing process to change the index of refraction of a region of the cladding material 212, as described in greater detail with reference to FIGS. 6A to 6P, below. As such, radiation may be preferentially propagated within the core portion 210 due to the phenomena of total internal reflection.

According to various embodiments, each of the first dielectric pillar 306a and the first dielectric cap 308a may include a polymer material that is transparent to infrared radiation. The photonic coupler 304a may provide an improved coupling of radiation between the dielectric waveguide 302 and other optical elements by focusing radiation transmitted through the photonic coupler 304a. For example, as shown in FIG. 3A, the photonic coupler 304a may act to couple a photonic signal (i.e., a beam of infrared radiation (314a, 314b)) between the dielectric waveguide 302 and an optical fiber 312. In this regard, incident radiation 314a within the first dielectric waveguide 302 that propagates toward the first dielectric cap 308a may be transmitted by the photonic coupler 304a to a region external to the dielectric waveguide 302 as a beam of transmitted radiation 314b. The first dielectric cap 308a may function as a lens such that the transmitted radiation 314b may be focused by the first dielectric cap 308a to a first beam width w1 that is smaller than a second width w2. The second width w2 may characterize a size of the core portion 210 of the dielectric waveguide 302. Put another way, the second width w2 may be substantially equal to the diameter (or width) of the core portion 210 embedded within the cladding portion 212. According to various embodiments, the first width w1 may be between 2 microns and 3 microns and the second width w2 may be between 3 microns and 4 microns.

According to various embodiments, the transmitted radiation 314b may take the form of a Gaussian beam that may be initially focused to a minimum width (i.e., the first beam width w1) at a first distance d1 from the first surface 310a of the cladding portion 212 (also the boundary between the first surface 310a of the cladding portion 212 and the photonic coupler 304a). As the transmitted radiation 314b propagates beyond the first distance d1, the width of the beam may increase with propagation distance such that at a second distance d2 the transmitted radiation 314b may have a third width w3 that is greater than both each of the first width w1 and the second width w2. The transmitted radiation 314b may be coupled into the optical fiber 312 in instances in which the third width w3 of the transmitted radiation 314b is less than or equal to a fourth width w4 which characterizes a diameter of an optical fiber core 316, as described in greater detail with reference to FIG. 3B, below.

Figure 3B:
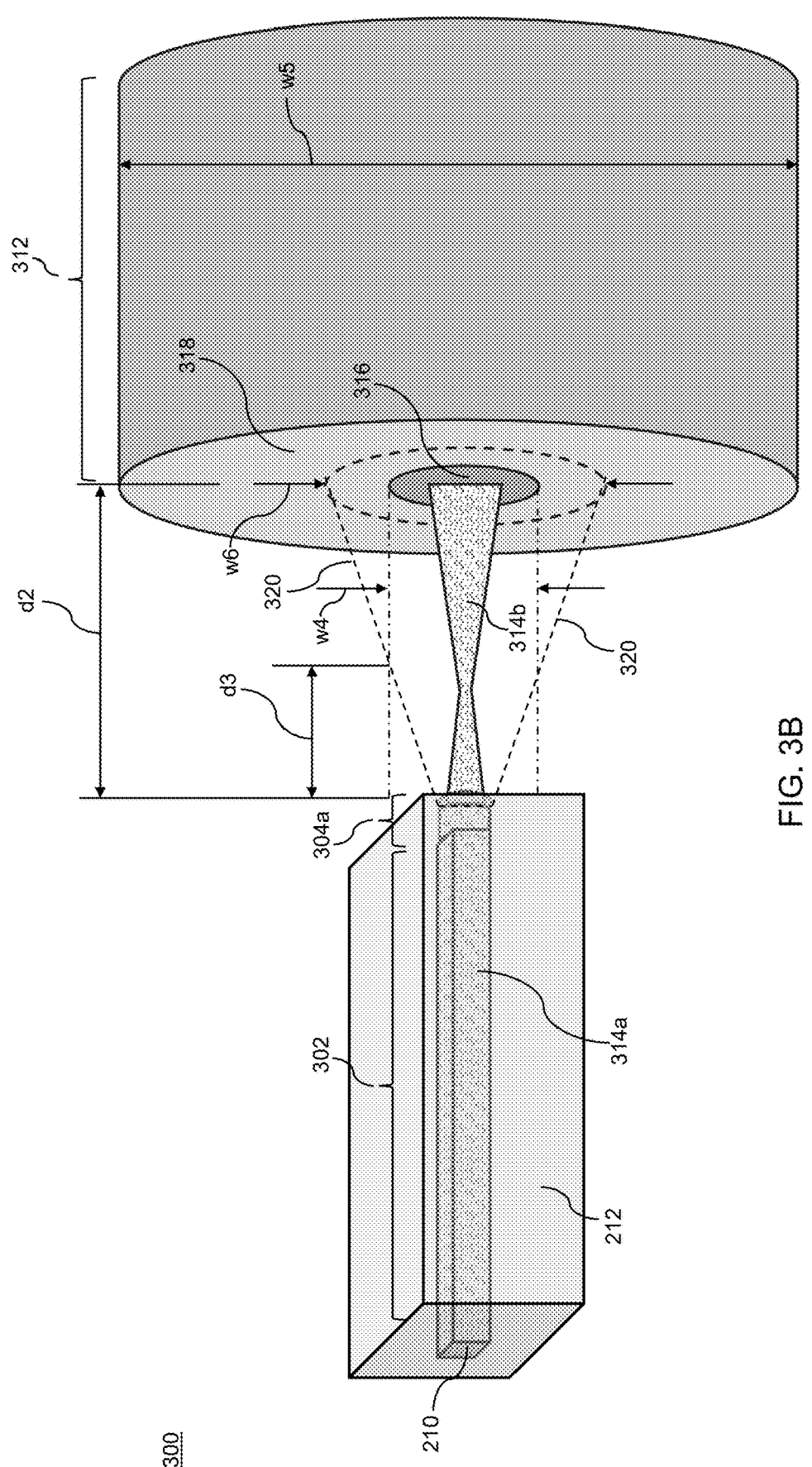
FIG. 3B is a perspective side view of the photonic device of FIG. 3A, according to various embodiments.

FIG. 3B is a perspective side view of the photonic device 300 of FIG. 3A, according to various embodiments. As shown in FIG. 3B, the optical fiber 312 may include an optical fiber core 316 surrounded by an optical fiber cladding 318. The optical fiber core 316 may have a diameter corresponding to the fourth width w4 and the optical fiber cladding 318 may have a diameter corresponding to a fifth width w5. According to various embodiments, the fourth width w4 may be between 7 microns and 8 microns (e.g., 8.2 microns) and the fifth width may approximately be between 120 microns and 130 microns (e.g., 125 microns). As shown in FIGS. 3A and 3B, the first photonic coupler 304a may act to focus the transmitted radiation 314b such that at the second distance d2 a width (i.e., the third width w3 illustrated in FIG. 3A) of the transmitted radiation 314b is less than the diameter w4 of the optical fiber core.

In contrast, in embodiments that omit the first photonic coupler 304a, the radiation emitted by the dielectric waveguide may take the form of an unfocused beam having an unfocused radiation pattern 320. As shown in FIG. 3B, the unfocused radiation pattern 320 may have a sixth width w6 at the distance d2 that is larger than the fourth width w4 (i.e., diameter of the optical fiber core 316). As such, the unfocused radiation pattern 320 may have a coupling to the optical fiber 312 that is less efficient than the transmitted radiation 314b that is focused by the first photonic coupler 304a. For example, as shown in FIG. 3B, the optical fiber 312 may be placed at a shorter distance (i.e., the third distance d3) such that the width of the unfocused radiation pattern 320 would be comparable to the fourth width w4 (i.e., diameter of the optical fiber core 316).

As such, the first photonic coupler 304a may be advantageous by allowing efficient coupling of the transmitted radiation 314b at a greater distance d2 than would be possible in embodiments that omit the first photonic coupler 304a. In this regard, a distance tolerance for positioning the optical fiber 312 relative to the dielectric waveguide 302 may be relaxed relative to embodiments in which the first photonic coupler 304a is omitted. Similarly, a tolerance for angular alignment of an optical fiber axis (i.e., a symmetry axis of the optical fiber (not explicitly shown)) relative to a dielectric waveguide axis (i.e., a symmetry axis of the dielectric waveguide 302 (not explicitly shown)) may be relaxed.

Figures 4A, 4B, 4C:
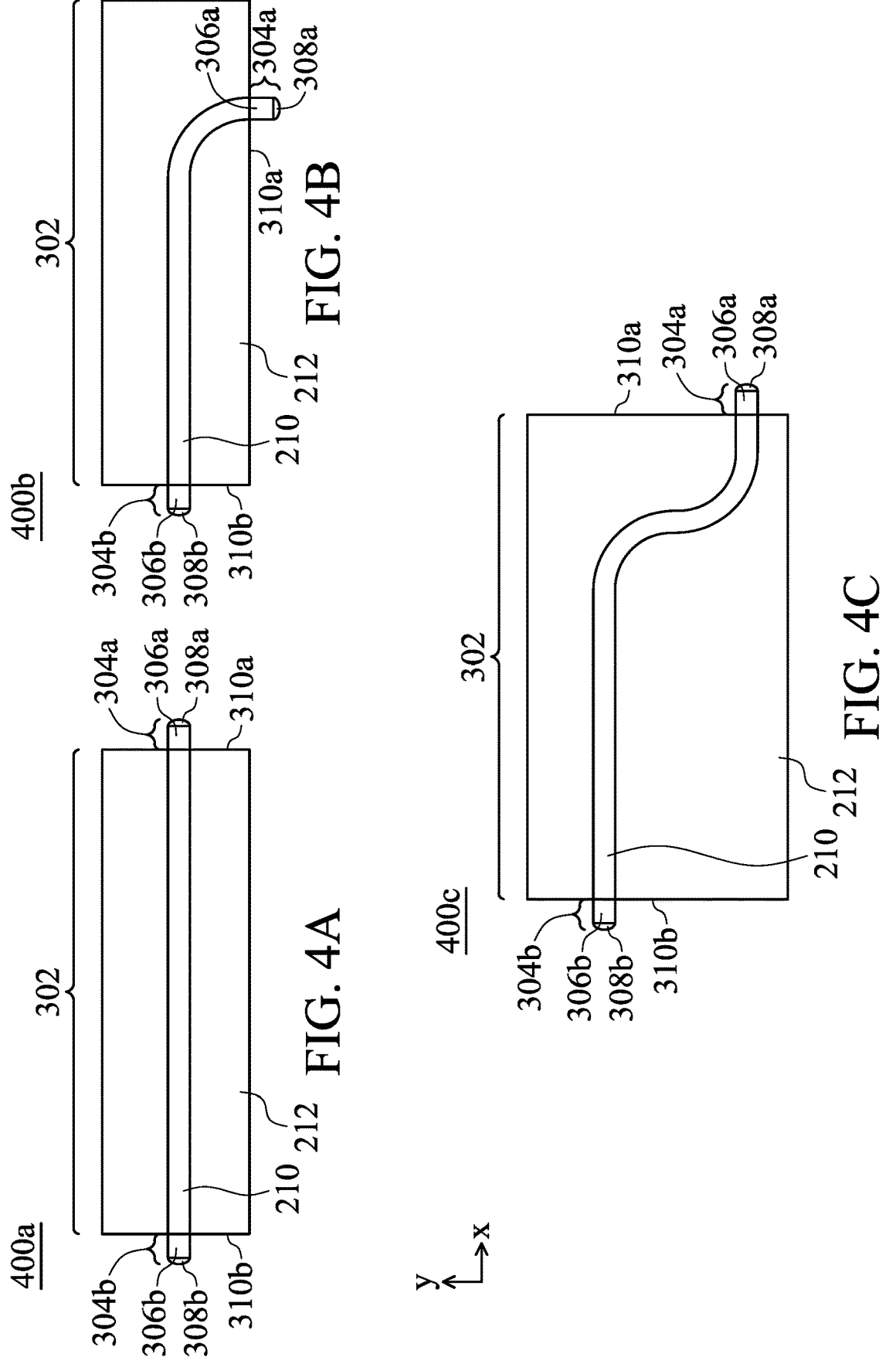
FIG. 4A is a vertical cross-sectional view of a photonic device having a first photonic coupler and a second photonic coupler, according to various embodiments.
FIG. 4B is a vertical cross-sectional view of a further photonic device having a first photonic coupler and a second photonic coupler, according to various embodiments.
FIG. 4C is a vertical cross-sectional view of a further photonic device having a first photonic coupler and a second photonic coupler, according to various embodiments.

FIGS. 4A to 4C are vertical cross-sectional views of respective photonic devices (400a, 400b, 400c) that each include a first photonic coupler 304a and a second photonic coupler 304b, according to various embodiments. As shown in each of FIGS. 4A to 4C, each photonic device (400a, 400b, 400c) may include a core portion 210 embedded in a cladding portion 212. Further, each core portion 210 may extend from a first surface 310a to a second surface 310b of the cladding portion 212. Each first photonic coupler 304a may be formed at the first surface 310a and may include a first dielectric pillar 306a, which may be optically coupled to the core portion 210, and a first dielectric cap 308a that may be optically coupled to the first dielectric pillar 306a. Similarly, each second photonic coupler 304b may be formed at the second surface 310b and may include a second dielectric pillar 306b, which may be optically coupled to the core portion 210, and a second dielectric cap 308b that may be optically coupled to the second dielectric pillar 306b.

In certain embodiments, as shown in FIGS. 4A and 4C, each of the first surface 310a and the second surface 310b of the cladding portion 212 may be parallel to one another. Alternatively, in other embodiments, the first surface 310a and the second surface 310b of the cladding portion 212 may not be parallel to one another. For example, as shown in FIG. 4B, the first surface 310a and the second surface 310b may be perpendicular to one another. In still further embodiments (not shown) the first surface 310a and the second surface 310b may be neither parallel nor perpendicular to one another, but rather, may form angle with respect to one another that may have any value between 0° (parallel) and 90° (perpendicular) depending on the shape of the photonic device in various embodiments.

In certain embodiments, as shown in FIG. 4A, the core portion 210 may provide a linear optical path through the cladding portion 212 such that the core portion 210, the first photonic coupler 304a, and the second photonic coupler 304b are aligned along a common axis (e.g., the x-axis in FIG. 4A). In other embodiments, as shown in FIGS. 4B and 4C, the core portion 210 may provide a curved optical path through the cladding portion 212 such that the first photonic coupler 304a and the second photonic coupler 304b are not aligned along a common axis.

Figure 4D:
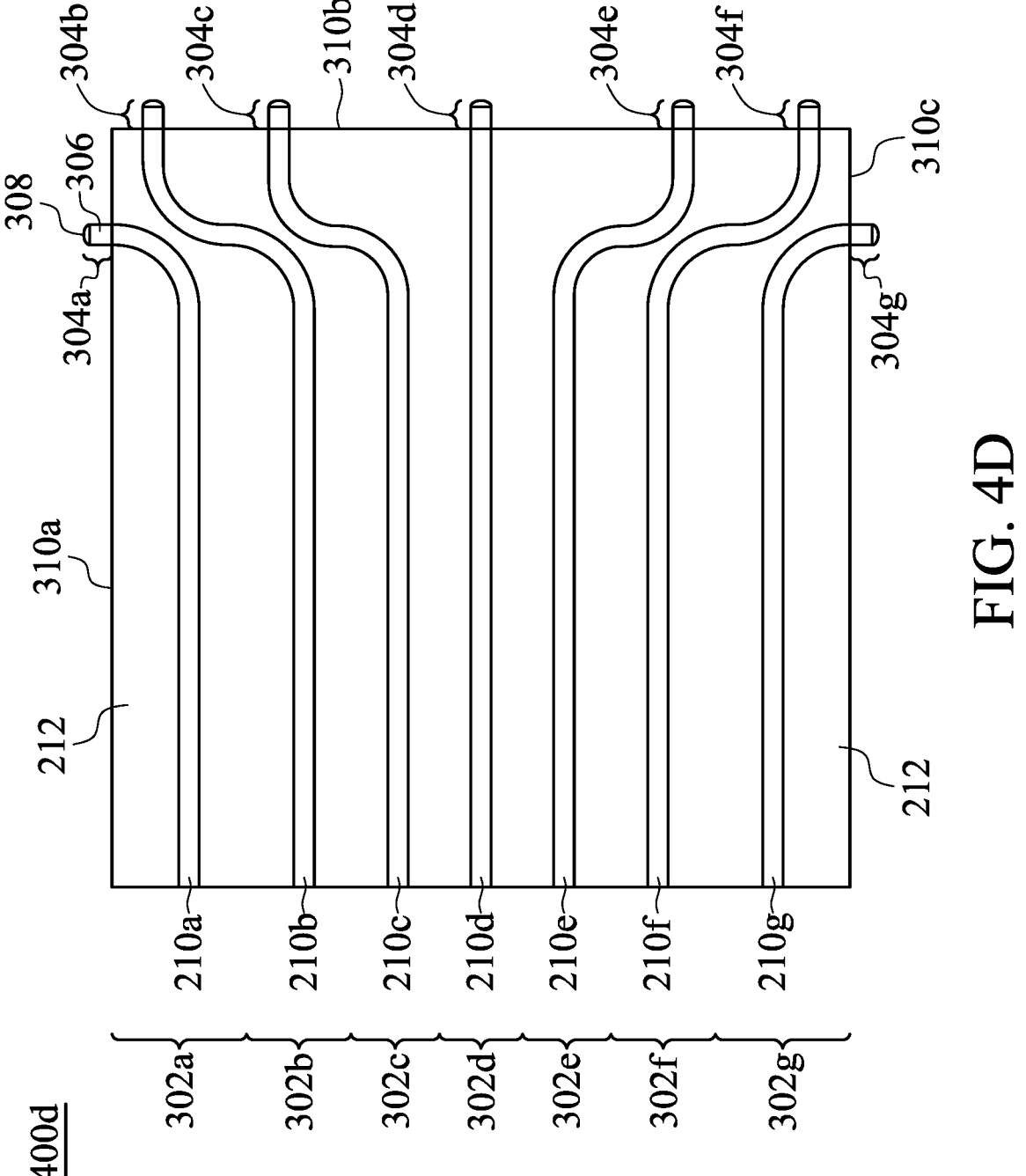
FIG. 4D is a top view of a photonic device including a plurality of dielectric waveguides and photonic couplers, according to various embodiments.

FIG. 4D is a top view of a photonic device 400d including a plurality of dielectric waveguides (302a to 302g) and photonic couplers (304a to 304g), according to various embodiments. According to various embodiments, one, some or all of the plurality of dielectric waveguides (302a to 302g) may be formed as part of a planar lightwave circuit. As shown in FIG. 4D, each of the plurality of dielectric waveguides (302a to 302g) may include a respective core portion (210a to 210g) formed in a cladding material 212. Further, each of the plurality of photonic couplers (304a to 304g) may include a dielectric pillar 306 formed at a respective surface (310a, 310b, 310c) of the cladding material 212 such that each of the plurality of photonic couplers (304a to 304g) is optically coupled to a corresponding core portion (210a to 210g). Each of the plurality of photonic couplers (304a to 304g) may further include a dielectric cap 308 attached to and optically coupled to the dielectric pillar 306.

As with other examples described above, each core portion (210a to 210g) may include a first material having a first index of refraction and the cladding material 212 may include a second material having a second index of refraction that is less than the first index of refraction. For example, each core portion (210a to 210g) may include doped or undoped silicon and the cladding portion 212 may include silicon dioxide. Alternatively, the cladding portion 212 may be a glass or polymer material and the core portion (210a to 210g) may be a modified material generated by performing a laser writing process to change the index of refraction of a region of the cladding material 212, as described in greater detail with reference to FIGS. 6A to 6P, below. As such, radiation may be preferentially propagated within each core portion (210a to 210g) due to the phenomena of total internal reflection. Also, as with other examples described above, each dielectric pillar 306 and each dielectric cap 308 may be formed of a polymer material that is transparent to infrared radiation.

Further, as shown FIGS. 3A and 3B, incident radiation 314a within each of the plurality of dielectric waveguides (302a to 302g) that propagates toward each respective dielectric cap 308 may be transmitted (not shown in FIG. 4D) by each respective photonic coupler (304a to 304g) to a region external to each of the plurality of dielectric waveguides (302a to 302g) as respective beams of transmitted radiation 314b (not shown in FIG. 4D). Further, each of the plurality of photonic couplers (304a to 304g) may generate focused transmitted radiation 314b from incident radiation 314a, as described above with reference to FIGS. 3A and 3B. As such, each of the photonic couplers (304a to 304g) may exhibit similar improved coupling efficiency and reduced alignment and positioning tolerances as with the embodiments described above with reference to FIGS. 3A and 3B.

In the example embodiment of FIG. 4D, the plurality of dielectric waveguides (302a to 302g) may have a fan-out configuration such that a spacing between adjacent ones of the plurality of dielectric waveguides (302a to 302g) may increase from a first side (e.g., the left side) to a second side (e.g., the right side) of the photonic device 400d. In this regard, some of the dielectric waveguides (e.g., dielectric waveguides 302a to 302c and 302e to 302g) may provide a curved optical path while other dielectric waveguides (e.g., dielectric waveguide 302d) may provide a linear optical path.

According to some embodiments, a first one of the plurality of photonic couplers (e.g., photonic coupler 304a) may be formed at a first surface 310a of the cladding material 212 that is different from a second surface 310b of the cladding material 212 on which a second one of plurality of photonic couplers (e.g., photonic coupler 304b) is formed. In the example embodiment of FIG. 4D, a first photonic coupler 304a is formed at a first surface 310a of the cladding material 212, five photonic couplers (304b to 304f) are formed at a second surface 310b of the cladding material 212, and a seventh photonic coupler 304g is formed at a third surface 310c of the cladding material 212. This configuration of the photonic device 400d of FIG. 4D is provided merely as an example embodiment and various other configurations and numbers of dielectric waveguides 302 and photonic couplers 304 may be provided in other embodiments.

Figures 5A, 5B:
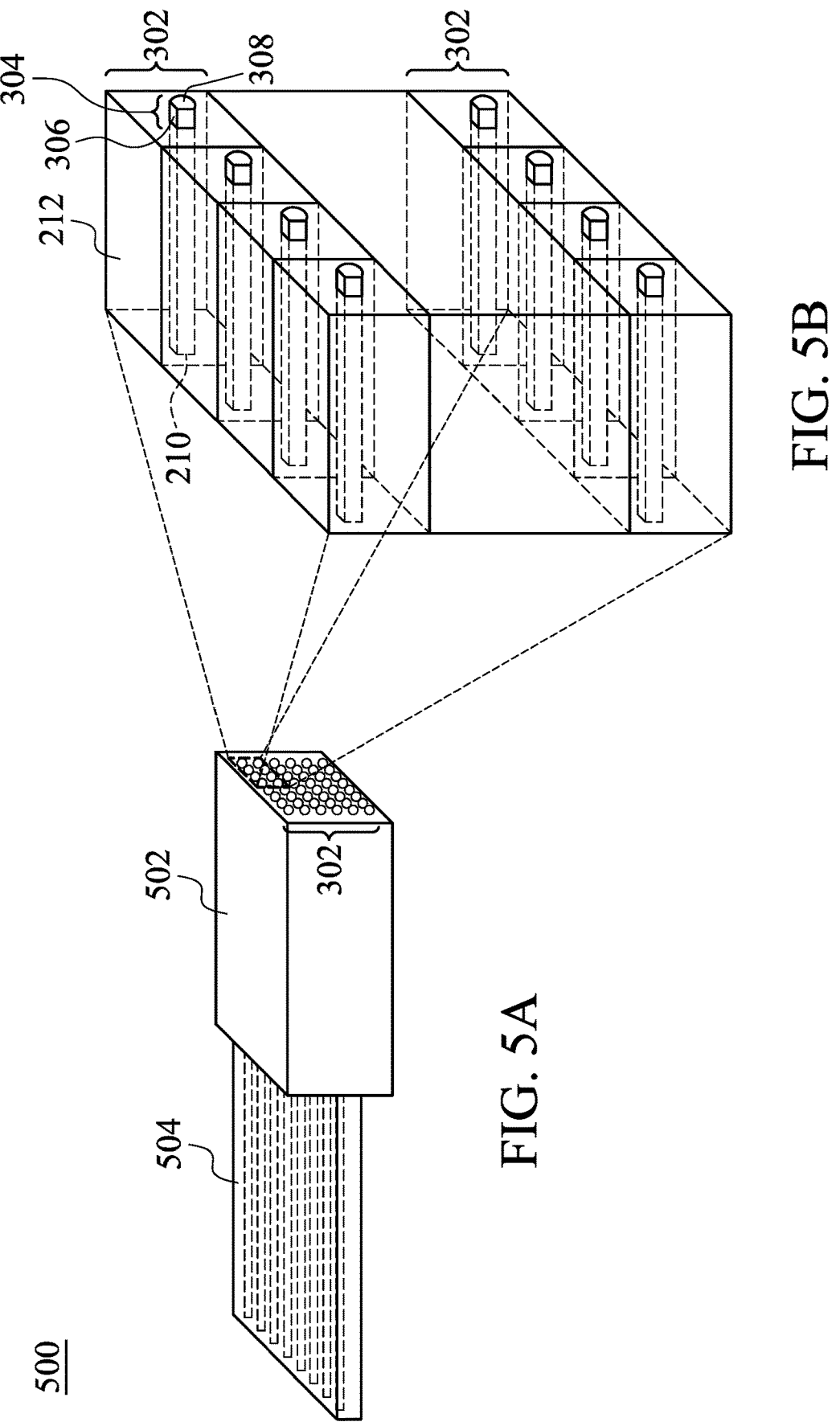
FIG. 5A is a three-dimensional perspective view of a photonic device including a plurality of dielectric waveguides arranged in a three-dimensional configuration, according to various embodiments.
FIG. 5B is an enlarged three-dimensional perspective view of a portion of the photonic device of FIG. 5A, according to various embodiments.

FIG. 5A is a three-dimensional perspective view of a photonic device 500 including a plurality of dielectric waveguides 302 arranged in a three-dimensional configuration, and FIG. 5B is an enlarged three-dimensional perspective view of a portion of the photonic device 500 of FIG. 5A, according to various embodiments. The photonic device 500 may be a component of a fiber array unit (FAU) that may include a housing 502 containing the plurality of dielectric waveguides 302. The plurality of dielectric waveguides 302 may be positioned such that each of the plurality of dielectric waveguides 302 may be coupled with a respective optical fiber 312 in a corresponding plurality of optical fibers 312, as described in greater detail with reference to FIG. 5C, below. As shown in FIG. 5A, the housing 502 may be connected to a flexible fiber optic cable 504 that may provide optical pathways for photonic signals provided to, and received from, the housing 502.

As shown in FIG. 5B, each of the plurality of dielectric waveguides 302 may include a core portion 210 embedded in a cladding material 212. Each of the plurality of dielectric waveguides may be optically coupled to a photonic coupler 304 that may include a dielectric pillar 306 that is optically coupled to the core portion 210 and a dielectric cap 308 that is optically coupled to the dielectric pillar 306. As with other example embodiments described above, the core portion 210 may include a first material having a first index of refraction and the cladding material 212 may include a second material having a second index of refraction that is less than the first index of refraction. For example, the core portion 210 may include doped or undoped silicon and the cladding material 212 may include silicon dioxide.

Alternatively, the cladding material 212 may be a glass or polymer material and the core portion 210 may be a modified material generated by performing a laser writing process to change the index of refraction of a region of the cladding material 212, as described in greater detail with reference to FIGS. 6A to 6P, below. As such, radiation may be preferentially propagated within each core portion 210 of each dielectric waveguide 302 due to the phenomena of total internal reflection. According to various embodiments, each of the first dielectric pillar 306a and the first dielectric cap 308a may include a polymer material that is transparent to infrared radiation. Each photonic coupler 304 may provide an improved coupling of radiation (314a, 314b) between each dielectric waveguide 302 and a respective optical fiber 312 by focusing radiation transmitted by the photonic coupler 304, as described in greater detail with reference to FIG. 5C, below.

Figure 5C:
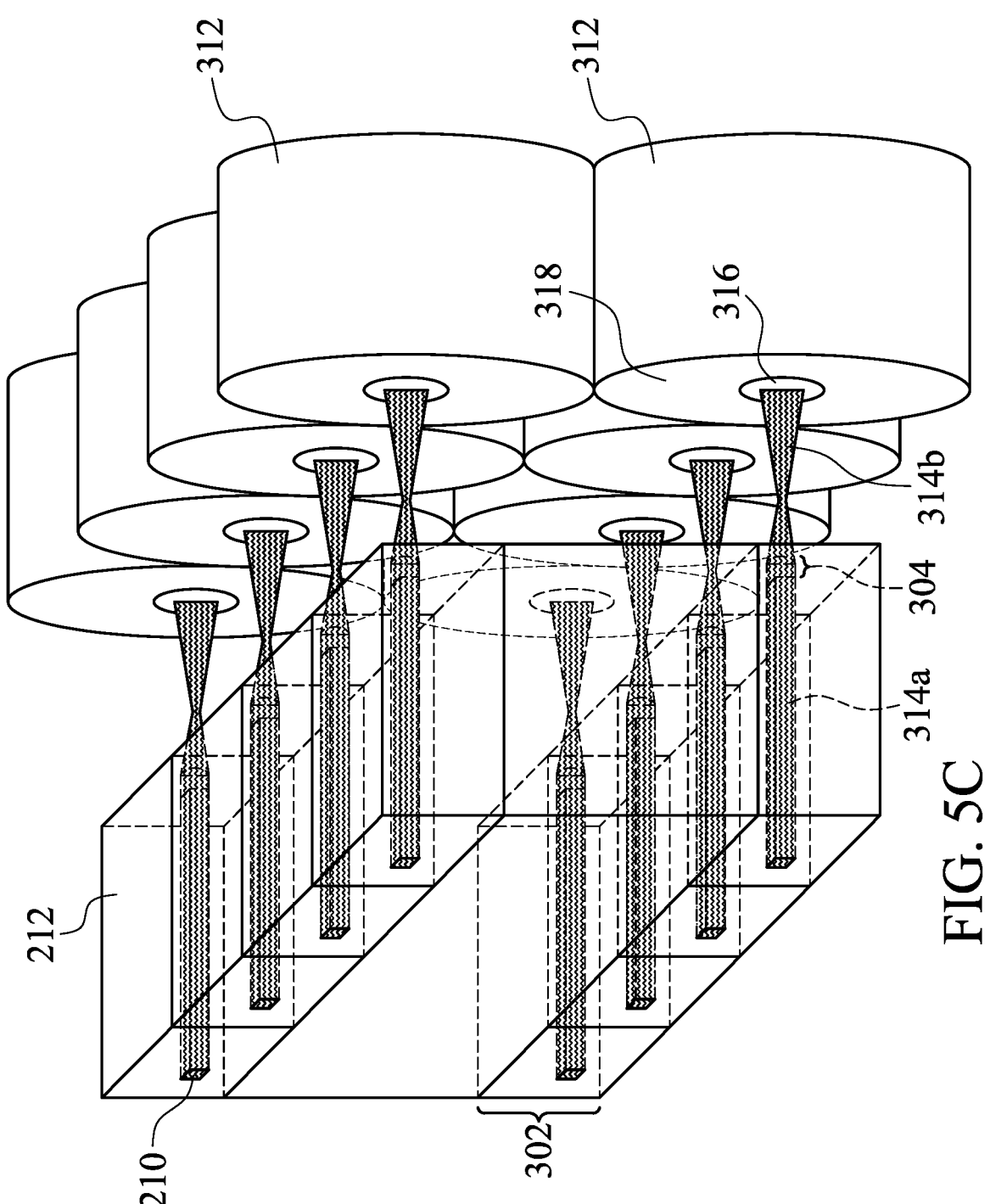
FIG. 5C is a three-dimensional perspective view of the portion of the photonic device of FIG. 5B positioned relative to an array of optical fibers, according to various embodiments.

FIG. 5C is a three-dimensional perspective view of the portion of the photonic device 500 of FIG. 5B positioned relative to an array of optical fibers 312, according to various embodiments. The photonic device 500 and the array of optical fibers may constitute components of a FAU. In this regard, the optical fibers may be positioned relative to the photonic device 500 in an optical fiber housing (not shown) such that accurate positioning of the optical fibers 312 relative to respective dielectric waveguides 302 may be achieved. As shown in FIG. 5C, each of the photonic couplers 304 may receive incident radiation 314a from a respective dielectric waveguide 302 and may generate transmitted radiation 314b that is focused by a respective dielectric cap 308 (e.g., see FIGS. 3A, 3B, 5B, and 5C). In this regard, each photonic coupler 304 may improve a coupling of radiation between the plurality of dielectric waveguides 302 and respective ones of the plurality of optical fibers 312, as described in greater detail with reference to FIGS. 3A and 3B, above. As such, each of the photonic couplers 304 may exhibit an improved coupling efficiency and reduced alignment and positioning tolerances relative to embodiments that omit the photonic couplers 304, as described above with reference to FIGS. 3A and 3B. As such, the photonic device 500 may provide an improved component of a FAU.

Figures 6A, 6B, 6C, 6D:
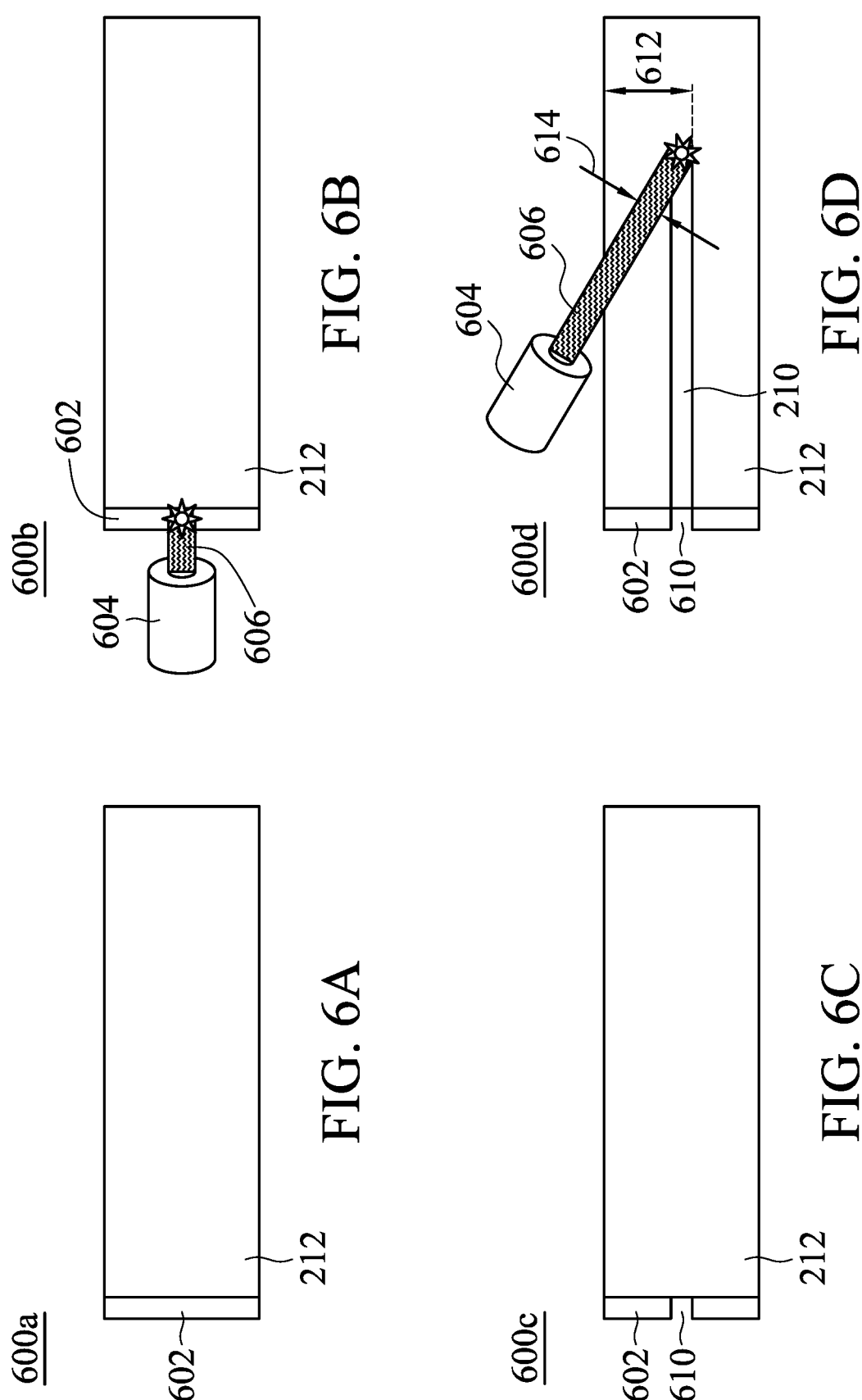
FIG. 6A is a vertical cross-sectional view of an intermediate structure that may be used in the formation of a photonic device, according to various embodiments.
FIG. 6B is a vertical cross-sectional view of a further intermediate structure that may be used in the formation of a photonic device, according to various embodiments.
FIG. 6C is a vertical cross-sectional view of a further intermediate structure that may be used in the formation of a photonic device, according to various embodiments.
FIG. 6D is a vertical cross-sectional view of a further intermediate structure that may be used in the formation of a photonic device, according to various embodiments.
Figure 6F:
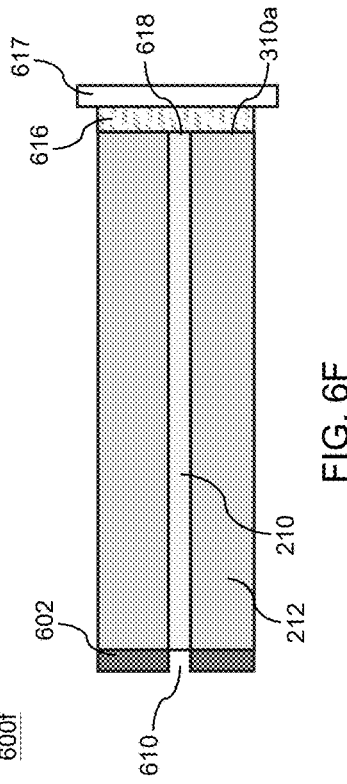
FIG. 6F is a vertical cross-sectional view of a further intermediate structure that may be used in the formation of a photonic device, according to various embodiments.

FIG. 6A is a vertical cross-sectional view of an intermediate structure 600a that may be used in the formation of a photonic device (300, 400a, 400b, 400c, 400d, 500), according to various embodiments. The intermediate structure 600a may include a slab of a cladding material 212 and a mask layer 602 formed on a first side of the cladding material 212. As described above, the cladding material 212 may be a glass or polymer material having optical properties that may be modified by performing a laser writing process.

The mask layer 602 may be chosen to be a hard-mask material that is opaque ultraviolet (UV) radiation. Various materials may be used for the mask layer 602. For example, according to certain embodiments, the mask layer 602 may be one of silicon nitride, silicon dioxide, tantalum pentoxide, aluminum oxide, titanium dioxide, zirconium dioxide, boron nitride, etc. The mask layer 602 may be deposited by a conformal deposition method. For example, silicon nitride and silicon dioxide may be deposited by chemical vapor deposition (CVD); tantalum pentoxide and aluminum oxide may be deposited by physical vapor deposition (PVD); aluminum oxide, titanium dioxide, and zirconium dioxide may be deposited by atomic layer deposition (ALD), and some materials such as titanium dioxide and zirconium dioxide may be deposited using chemical solution (e.g., Sol-Gel) techniques.

FIGS. 6B and 6C are vertical cross-sectional views of further intermediate structures (600b, 600c) that may be used in the formation of a photonic device (300, 400a, 400b, 400c, 400d, 500), according to various embodiments. As shown in FIG. 6B a laser 604 may be used to generate laser radiation 606 that may be directed toward the mask layer 602 to cause ablation of the mask layer 602 to thereby generate an aperture 610 in the mask layer 602, as shown in FIG. 6C. A laser writing operation may then be performed to form a core portion 210 of a waveguide 302, as described in greater detail with reference to FIGS. 6D and 6E, below.

Figure 6H:
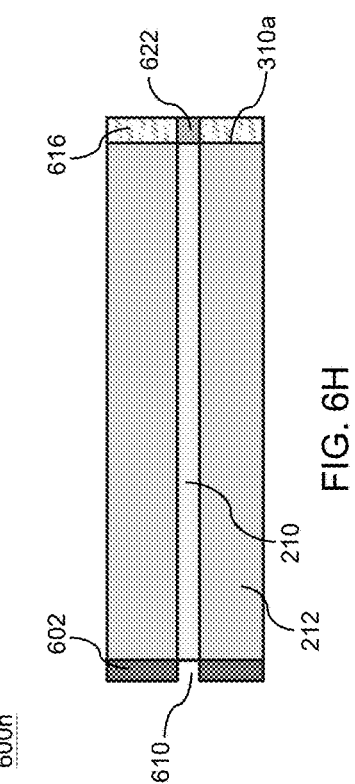
FIG. 6H is a vertical cross-sectional view of a further intermediate structure that may be used in the formation of a photonic device, according to various embodiments.
Figure 6E:
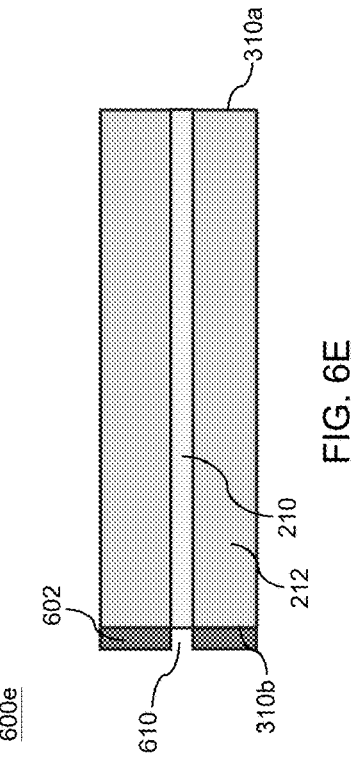
FIG. 6E is a vertical cross-sectional view of a further intermediate structure that may be used in the formation of a photonic device, according to various embodiments.

FIGS. 6D and 6E are vertical cross-sectional views of further intermediate structures (600d, 600e) that may be used in the formation of a photonic device (300, 400*a*, 400*b*, 400*c*, 400*d*, 500), according to various embodiments. As shown in FIG. 6D, a laser 604 may introduce laser radiation 606 within a volume of the cladding material 212. In this regard, the laser 604 may generate a beam of laser radiation 606 that is focused at a predetermined depth 612 with a predetermined spot size 614. The laser may then be moved along a predetermined path through the cladding material 212. For example, as shown in FIG. 6D, the laser radiation 606 may be scanned along a linear path through the cladding material 212 from left to right.

The laser radiation 606 may interact with the cladding material 212 and may generate a modified material that has optical properties that may be different from the surrounding cladding material 212. In this regard, a core portion 210 may be generated in a region that is subjected to the laser radiation 606. As shown in FIG. 6E, a core portion 210 may be formed that extends from a first surface 310*a* to a second surface 310*b* of the cladding portion 212 by scanning the laser radiation 606 across the slab of the cladding material 212.

FIGS. 6F to 6I are vertical cross-sectional views of further intermediate structures (600*f*, 600*g*, 600*h*, 600*i*) that may be used in the formation of a photonic device (300, 400*a*, 400*b*, 400*c*, 400*d*, 500), according to various embodiments. The intermediate structure 600*f* may be formed from the intermediate structure 600*e* of FIG. 6E by forming a layer of a radiation-curable polymer 616 over the first surface 310*a* of the cladding material 212 such that the radiation-curable polymer 616 is formed in contact with a core surface 618 of the core portion 210. Optionally, according to some embodiments, a glass slide 617 may be placed in contact with the radiation-curable polymer 616 to mechanically support the radiation-curable polymer 616.

Figure 6G:
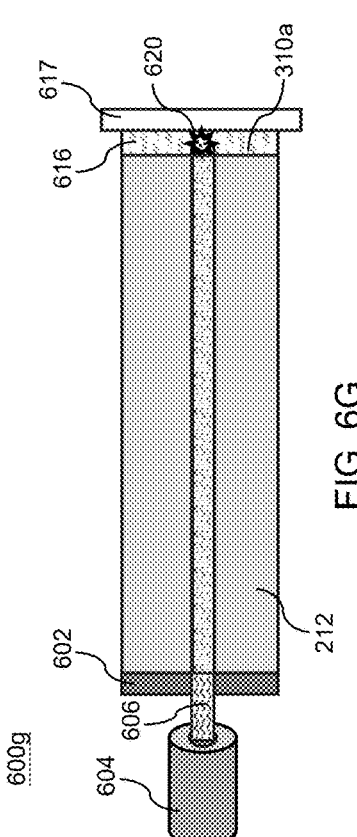
FIG. 6G is a vertical cross-sectional view of a further intermediate structure that may be used in the formation of a photonic device, according to various embodiments.

The radiation-curable polymer 616 may then be irradiated with laser radiation 606 in a localized region 620, as shown in FIG. 6G, to thereby form a cured region 622, as shown in FIG. 6H. In this regard, according to certain embodiments, laser radiation 606 may be introduced into the core portion 210 of the waveguide such that the laser radiation 606 is incident on the radiation-curable polymer 616 from the core portion 210, as shown in FIG. 6G. As shown in FIG. 6G, the aperture 610 in the mask layer 602 (e.g., see FIG. 6F) may be used to confine the laser radiation 606 to the core portion 210. Providing the laser radiation 606 to the radiation-curable polymer 616 through the core portion 210, as shown in FIG. 6G, allows the cured region 622 to be precisely aligned (i.e., self-aligned) with the core portion 210 as shown in FIG. 6H. The cured region 622 then forms the first dielectric pillar 306*a*, as shown in FIG. 6I, upon removing the glass slide 617 and the remaining uncured portion of the radiation-curable polymer 616.

Figures 6I, 6J, 6K, 6L:
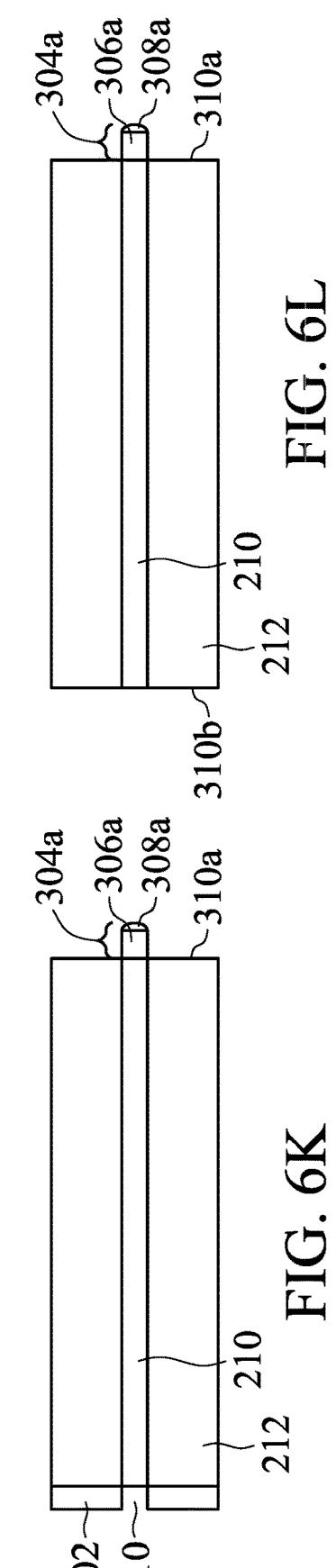
FIG. 6I is a vertical cross-sectional view of a further intermediate structure that may be used in the formation of a photonic device, according to various embodiments.
FIG. 6J is a vertical cross-sectional view of a further intermediate structure that may be used in the formation of a photonic device, according to various embodiments.
FIG. 6K is a vertical cross-sectional view of a further intermediate structure that may be used in the formation of a photonic device, according to various embodiments.
FIG. 6L is a vertical cross-sectional view of a further intermediate structure that may be used in the formation of a photonic device, according to various embodiments.

FIGS. 6J and 6K are vertical cross-sectional views of further intermediate structures (600*j*, 600*k*) that may be used in the formation of a photonic device (300, 400*a*, 400*b*, 400*c*, 400*d*, 500), according to various embodiments. In this regard, an uncured portion 624 of the radiation-curable polymer 616 may be formed over the first dielectric pillar 306*a* as shown in FIG. 6J. Also, as shown in FIG. 6J, the uncured portion 624 of the radiation-curable polymer 616 may be irradiated with UV radiation 625 to thereby cure the radiation-curable polymer 616. The resulting structure may form the first dielectric cap 308*a*, as shown in FIG. 6K. The UV radiation 625 may be provided as laser radiation 606 or as UV radiation from a UV lamp (not shown).

FIGS. 6L to 6P are vertical cross-sectional views of further intermediate structures (600*l*, 600*m*, 600*n*, 600*o*,

600*p*) that may be used in the formation of a photonic device (300, 400*a*, 400*b*, 400*c*, 400*d*, 500), according to various embodiments. The intermediate structure 600*l* may be formed from the intermediate structure 600*k* of FIG. 6K by removing the mask layer 602, for example, by etching or ashing. The intermediate structure 600*m* may be formed from the intermediate structure 600*l* of FIG. 6L by forming a layer of a radiation-curable polymer 616 over the second surface 310*b* of the cladding material 212 such that the radiation-curable polymer 616 is formed in contact with a core surface 618 of the core portion 210. Optionally, according to some embodiments, a glass slide 617 may be placed in contact with the radiation-curable polymer 616 to mechanically support the radiation-curable polymer 616.

Figures 6M, 6N, 6O, 6P:
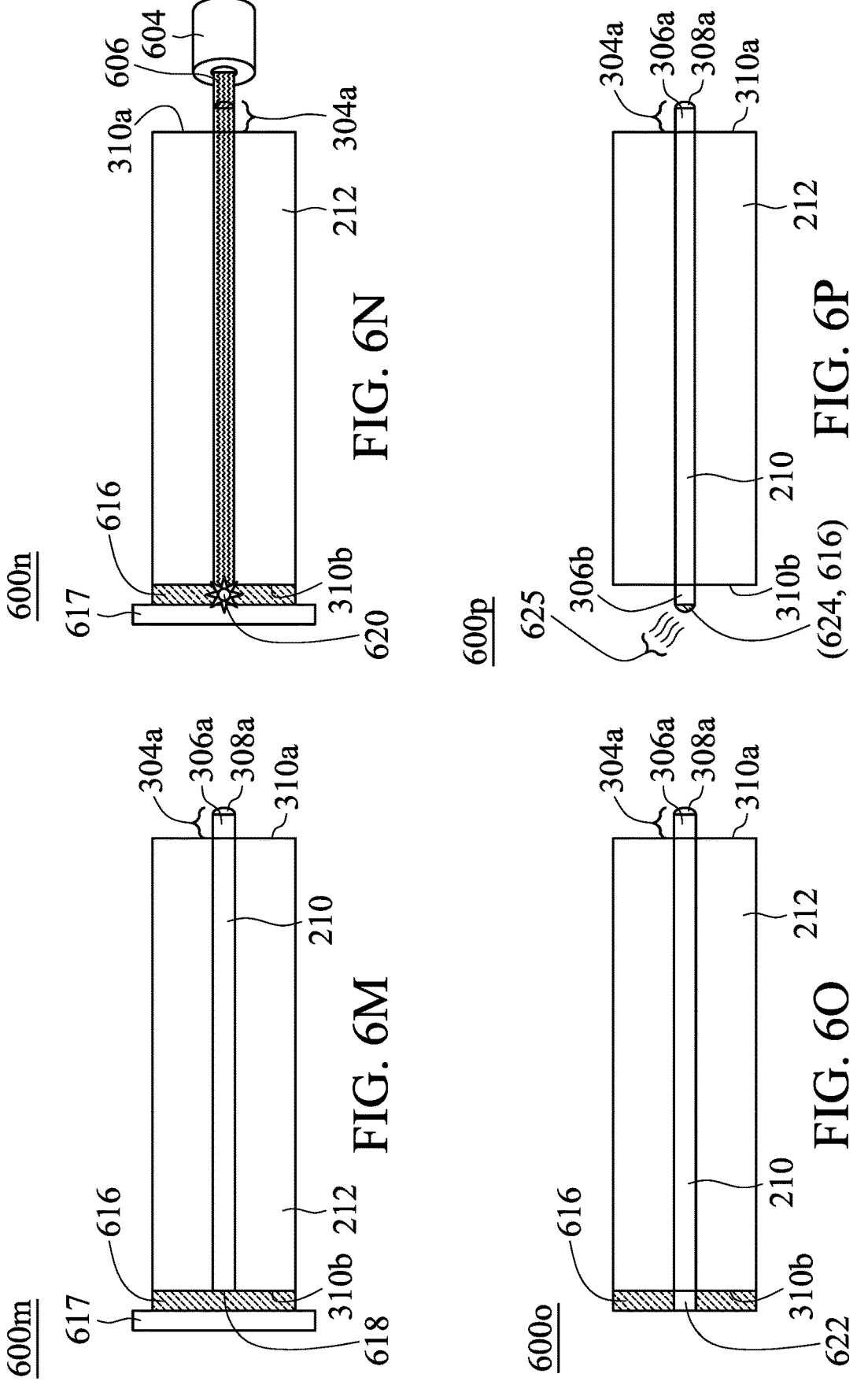
FIG. 6M is a vertical cross-sectional view of a further intermediate structure that may be used in the formation of a photonic device, according to various embodiments.
FIG. 6N is a vertical cross-sectional view of a further intermediate structure that may be used in the formation of a photonic device, according to various embodiments.
FIG. 6O is a vertical cross-sectional view of a further intermediate structure that may be used in the formation of a photonic device, according to various embodiments.
FIG. 6P is a vertical cross-sectional view of a further intermediate structure that may be used in the formation of a photonic device, according to various embodiments.

The radiation-curable polymer 616 may then be irradiated with laser radiation 606 in a localized region 620, as shown in FIG. 6N, to thereby form a cured region 622, as shown in FIG. 6O. In this regard, according to certain embodiments, laser radiation 606 may be introduced into the core portion 210 through the first photonic coupler 304*a* such that the laser radiation 606 is incident on the radiation-curable polymer 616 from the core portion 210, as shown in FIG. 6N. Also as shown in FIG. 6N, the first photonic coupler 304*a* may be used to confine the laser radiation 606 to the core portion 210. Providing the laser radiation 606 to the radiation-curable polymer 616 through the core portion 210, as shown in FIG. 6N, allows the cured region 622 to be precisely aligned (i.e., self-aligned) with the core portion 210 as shown in FIG. 6O. The cured region 622 then may form the second dielectric pillar 306*b* upon removing the remaining uncured portion of the radiation-curable polymer 616, as shown in FIG. 6P.

As further shown in FIG. 6P, an uncured portion 624 of the radiation-curable polymer 616 may be formed over the second dielectric pillar 306*b*. Also, as shown in FIG. 6P, the uncured portion 624 of the radiation-curable polymer 616 may be irradiated with UV radiation 625 to thereby cure the radiation-curable polymer 616. The resulting structure may form the second dielectric cap 308*b* as shown, for example, in FIG. 4A. The UV radiation 625 may be provided as laser radiation 606 or as UV radiation from a UV lamp (not shown).

FIG. 7 is a flowchart illustrating operations of a method 700 of forming a photonic device (300, 400*a*, 400*b*, 400*c*, 400*d*, 500), according to various embodiments. In operation 702, the method 700 may include irradiating a localized region 620 of a cladding material 212 with laser radiation 606 in a laser-writing operation to thereby form a core portion 210 of a waveguide 302, such that the core portion 210 extends to a first surface 310*a* of the cladding material 212. In operation 704, the method 700 may include forming a first dielectric pillar 306*a* at the first surface 310*a* of the cladding material 212 such that the first dielectric pillar 306*a* is optically coupled to the core portion 210.

In this regard, forming the first dielectric pillar 306*a* according to operation 704 may include forming a layer of a radiation-curable polymer 616 over the first surface 310*a* of the cladding material 212 such that the radiation-curable polymer 616 is formed in contact with a core surface 618 of the core portion 210. Operation 704 of the method 700 may further include irradiating the radiation-curable polymer 616 in a localized region 620 over the first surface 310*a* of the cladding material 212 to thereby form the first dielectric pillar 306*a* including a cured region 622 of the radiation-curable polymer 616.

In operation 706, the method 700 may include forming a first dielectric cap 308*a* that is attached to and optically coupled to the first dielectric pillar 306*a*. In this regard, forming the first dielectric cap 308*a*, according to operation 706, may include forming an uncured portion 624 of the radiation-curable polymer 616 over the first dielectric pillar 306*a* and irradiating the uncured portion 624 of the radiation-curable polymer 616 to thereby form the first dielectric cap 308*a*. In irradiating the radiation-curable polymer 616 in the localized region 620, according to operation 704, the method 700 may further include introducing the laser radiation 606 into the core portion 210 of the waveguide 302 such that the laser radiation 606 is incident on the radiation-curable polymer 616 from the core portion 210 of the waveguide 302. The laser radiation 606 may then be absorbed by the radiation-curable polymer 616 to thereby form the first dielectric pillar 306*a*.

In operation 708, the method 700 may optionally include forming a second dielectric pillar 306*b* at a second surface 310*b* of the cladding material 212 such that the second dielectric pillar 306*b* is optically coupled to the core portion 210. Similarly, in operation 710, the method 700 may optionally include forming a second dielectric cap 308*b* that is attached to and optically coupled to the second dielectric pillar 306*b*.

Referring to all drawings and according to various embodiments of the present disclosure, a photonic device (300, 400*a*, 400*b*, 400*c*, 400*d*, 500) is provided. The photonic device (300, 400*a*, 400*b*, 400*c*, 400*d*, 500) may include a dielectric waveguide 302 including a core portion 210 and a cladding portion 212 and a first photonic coupler 304*a*. The first photonic coupler 304*a* may include a first dielectric pillar 306*a* formed at a first surface 310*a* of the cladding portion 212 and optically coupled to the core portion 210, and a first dielectric cap 308*a* attached to and optically coupled to the first dielectric pillar 306*a*. The core portion 210 may include a first material having a first index of refraction and the cladding portion 212 may include a second material having a second index of refraction that is less than the first index of refraction. For example, in certain embodiments, the core portion 210 may include silicon and the cladding portion 212 may include silicon dioxide. Each of the first dielectric pillar 306*a* and the first dielectric cap 308*a* include a polymer material that is transparent to infrared radiation.

The photonic device (300, 400*a*, 400*b*, 400*c*, 400*d*, 500) may be configured such that radiation 314*a* incident on the first dielectric cap 308*a* from the core portion 210 may be focused by the first dielectric cap 308*a* to a beam width w1 that is smaller than a width w2 of the core portion 210 of the dielectric waveguide 302. According to certain embodiments, the photonic device (300, 400*a*, 400*b*, 400*c*, 400*d*, 500) may further include a second photonic coupler 304*b*. The second photonic coupler 304*b* may further include a second dielectric pillar 306*b* formed at a second surface 310*b* of the cladding portion 212 and optically coupled to the core portion 210, and a second dielectric cap 308*b* attached to and optically coupled to the second dielectric pillar 306*b*.

In certain embodiments, the first surface 310*a* and the second surface 310*b* of the cladding portion 212 may be parallel to one another (e.g., see FIGS. 4A and 4C), and the core portion 210 may include a linear optical path through the cladding portion 212 such that the core portion 210, the first photonic coupler 304*a*, and the second photonic coupler 304*b* are aligned with a common axis (e.g., see FIG. 4A). In other embodiments, the first surface 310*a* and the second surface 310*b* of the cladding portion 212 may be parallel to one another (e.g., see FIGS. 4A and 4C), and the core portion 210 may include a curved optical path (e.g., see FIGS. 4B and 4C) through the cladding portion 212 such that the first photonic coupler 304*a* and the second photonic coupler 304*b* are not aligned with a common axis (e.g., see FIG. 4C). In still further embodiments, the first surface 310*a* and the second surface 310*b* of the cladding portion 212 may be not parallel to one another (e.g., see FIG. 4B), and the core portion 210 may include a curved optical path (e.g., see FIGS. 4B and 4C) through the cladding portion 212. For example, in some embodiments, the first surface 310*a* and the second surface 310*b* of the cladding portion 212 may be perpendicular to one another (e.g., see FIG. 4B).

Referring to all drawings and according to various embodiments of the present disclosure, a photonic device (300, 400*a*, 400*b*, 400*c*, 400*d*, 500) is provided. The photonic device (300, 400*a*, 400*b*, 400*c*, 400*d*, 500) may include: a dielectric waveguide 302 comprising a core portion 210 and a cladding portion 212; and a first photonic coupler 304*a* that includes: a first dielectric pillar 306*a* formed at a first surface 310*a* of the cladding portion 212 and optically coupled to the core portion 210; and a first dielectric cap 308*a* attached to and optically coupled to the first dielectric pillar 306*a*.

In one embodiment, the core portion 210 may include a first material having a first index of refraction and the cladding portion 212 comprises a second material having a second index of refraction that is less than the first index of refraction. In one embodiment, the core portion 210 comprises silicon and the cladding portion 212 comprises silicon dioxide. In one embodiment, each of the first dielectric pillar 306*a* and the first dielectric cap 308*a* comprise a polymer material that is transparent to infrared radiation. In one embodiment, radiation incident on the first dielectric cap 308*a* from the core portion 210 is focused by the first dielectric cap 308*a* to a beam width that is smaller than a width of the core portion 210 of the dielectric waveguide 302. In one embodiment, the photonic device may further include: a second photonic coupler 304*b* comprising: a second dielectric pillar 306*b* formed at a second surface 310*b* of the cladding portion 212 and optically coupled to the core portion 210; and a second dielectric cap 308*b* attached to and optically coupled to the second dielectric pillar 306*a*. In one embodiment, the first surface 310*a* of the cladding portion 212 and the second surface 310*b* of the cladding portion 212 are parallel to one another; and the core portion 210 comprises a linear optical path through the cladding portion 212 such that the core portion 210, the first photonic coupler 304*a*, and the second photonic coupler 304*b* are aligned along a common axis. In one embodiment, the first surface 310*a* of the cladding portion 212 and the second surface 310*b* of the cladding portion 212 are parallel to one another; and the core portion 210 comprises a curved optical path through the cladding portion 212 such that the first photonic coupler 304*a* and the second photonic coupler 304*b* are not aligned along a common axis. In one embodiment, the first surface 310*a* of the cladding portion 212 and the second surface 310*b* of the cladding portion 212 are not parallel to one another; and the core portion 210 comprises a curved optical path through the cladding portion 212. In one embodiment, the first surface 310*a* of the cladding portion 212 and the second surface 310*b* of the cladding portion 212 are perpendicular to one another.

Referring to all drawings and according to various embodiments of the present disclosure, a photonic device (300, 400*a*, 400*b*, 400*c*, 400*d*, 500) is provided. The photonic device (300, 400*a*, 400*b*, 400*c*, 400*d*, 500) may include a plurality of dielectric waveguides (302*a* to 302*g*) each including a respective core portion (210*a* to 210*g*) formed in a cladding material 212 and a plurality of photonic couplers (304a to 304g). The plurality of photonic couplers (304a to 304g) may each include a dielectric pillar 306 formed at a first surface of the cladding material 212 and optically coupled to the core portion 210, and a dielectric cap 308 attached to and optically coupled to the dielectric pillar 306.

In one embodiment, each of the respective core portions (210a to 210g) comprises silicon and the cladding material 212 comprises silicon dioxide. In one embodiment, each of the dielectric pillar 306 and the dielectric cap 308 comprise a polymer material that is transparent to infrared radiation, and wherein radiation incident on the dielectric cap 308 from each of the plurality of dielectric waveguides (302a-302g) is focused by the respective dielectric cap 308 to a beam width that is smaller than a width of the respective core portion 210 of the waveguide (302a-302g). In one embodiment, a first one of the plurality of photonic couplers (304a to 304g) may be formed at the first surface 310a of the cladding material 212 that is different from a second surface 310b, 310c of the cladding material 212 on which a second one of plurality of photonic couplers is formed. In one embodiment, the plurality of dielectric waveguides (302a-302g) may be formed as part of a planar lightwave circuit, and wherein the plurality of dielectric waveguides (302a-302g) comprises a fan-out configuration (e.g., see FIG. 4D). In one embodiment, the plurality of dielectric waveguides (302a-302g) may be arranged in a three-dimensional configuration within the cladding material 212 (e.g., see FIGS. 5A to 5C).

Embodiment photonic devices (300, 400a, 400b, 400c, 400d, 500) may be advantageous by providing dielectric waveguides (302, 302a to 302g) having photonic couplers (304a to 304g) that each receive incident radiation 314a propagating within a respective dielectric waveguide (302, 302a to 302g) and generate transmitted radiation 314b that is focused in a region external to the dielectric waveguide (302, 302a to 302g). The focused transmitted radiation 314b may be more efficiently received by a receiving optical component, such as an optical fiber 312, because the focused transmitted radiation 314b may generally spread (i.e., diverge) more gradually with distance than unfocused radiation 320. As such, embodiment photonic devices (300, 400a, 400b, 400c, 400d, 500) that include the embodiment photonic couplers (304a to 304g) may exhibit improved coupling efficiency and reduced alignment and positioning tolerances relative to embodiments that omit such photonic couplers (304a to 304g). Such photonic couplers (304a to 304g) may thereby allow formation of photonic integrated circuits having an increased integration density and may provide smaller devices with reduced optical insertion loss relative to systems that omit the embodiment photonic couplers.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure

18

What is claimed is:

1. A method of forming a photonic device, comprising:
irradiating a region of a cladding material with laser radiation in a laser-writing operation to thereby form a core portion of a waveguide, wherein the core portion extends to a first surface of the cladding material;
forming a first dielectric pillar at the first surface of the cladding material such that the first dielectric pillar is optically coupled to the core portion; and
forming a first dielectric cap that is attached to and optically coupled to the first dielectric pillar.

2. The method of claim 1, wherein:
forming the first dielectric pillar further comprises:
forming a layer of a radiation-curable polymer over the first surface of the cladding material such that the radiation-curable polymer is formed in contact with a core surface of the core portion; and
irradiating the radiation-curable polymer in a localized region over the first surface of the cladding material to thereby form the first dielectric pillar comprising a cured region of the radiation-curable polymer; and
forming the first dielectric cap further comprises:
forming a portion of the radiation-curable polymer over the first dielectric pillar; and
irradiating the portion of the radiation-curable polymer to thereby form the first dielectric cap.

3. The method of claim 2, wherein irradiating the radiation-curable polymer in the localized region further comprises introducing the laser radiation into the core portion of the waveguide such that the laser radiation is incident on the radiation-curable polymer from the core portion of the waveguide and is thereby absorbed by the radiation-curable polymer to thereby form the first dielectric pillar.

4. The method of claim 1, further comprising:
forming a second dielectric pillar at a second surface of the cladding material such that the second dielectric pillar is optically coupled to the core portion; and
forming a second dielectric cap that is attached to and optically coupled to the second dielectric pillar.

5. A method of forming a photonic device, comprising:
forming a mask layer on a first side of a cladding material;
irradiating the mask layer with laser radiation to cause ablation of the mask layer to generate an aperture in the mask layer;
irradiating a region of the cladding material with laser radiation in a laser-writing operation forming a core portion of a waveguide, wherein the core portion extends to a first surface of the cladding material;
forming a first dielectric pillar at the first surface of the cladding material such that the first dielectric pillar is optically coupled to the core portion; and
forming a first dielectric cap that is attached to and optically coupled to the first dielectric pillar.

6. The method of claim 5, wherein the mask layer comprises a material that is opaque to ultraviolet radiation.

7. The method of claim 6, wherein the mask layer comprises one of silicon nitride, silicon dioxide, tantalum pentoxide, aluminum oxide, titanium dioxide, zirconium dioxide, or boron nitride.

8. The method of claim 5, wherein the aperture in the mask layer is configured to confine the laser radiation to the core portion during formation of the first dielectric pillar.

9. The method of claim 5, wherein forming the first dielectric pillar further comprises:
forming a layer of a radiation-curable polymer over the first surface of the cladding material such that the radiation-curable polymer is formed in contact with a core surface of the core portion; and irradiating the radiation-curable polymer in a localized region over the first surface of the cladding material to form the first dielectric pillar comprising a cured region of the radiation-curable polymer.

10. The method of claim 9, further comprising placing a glass slide in contact with the radiation-curable polymer to mechanically support the radiation-curable polymer.

11. The method of claim 9, wherein irradiating the radiation-curable polymer in the localized region further comprises introducing the laser radiation into the core portion of the waveguide such that the laser radiation is incident on the radiation-curable polymer from the core portion of the waveguide, wherein the cured region is self-aligned with the core portion.

12. The method of claim 5, further comprising:

removing the mask layer;

forming a second dielectric pillar at a second surface of the cladding material such that the second dielectric pillar is optically coupled to the core portion; and forming a second dielectric cap that is attached to and optically coupled to the second dielectric pillar.

13. A method of forming a photonic device, comprising:

irradiating a plurality of regions of a cladding material with laser radiation in a laser-writing operation forming a plurality of core portions of a plurality of dielectric waveguides;

forming a plurality of dielectric pillars at a surface of the cladding material such that each of the plurality of dielectric pillars is optically coupled to a respective one of the plurality of core portions; and forming a plurality of dielectric caps, each attached to and optically coupled to a respective one of the plurality of dielectric pillars.

14. The method of claim 13, wherein the plurality of dielectric waveguides is formed as part of a planar lightwave circuit.

15. The method of claim 14, wherein the plurality of dielectric waveguides comprises a fan-out configuration.

16. The method of claim 13, wherein the plurality of dielectric waveguides is arranged in a three-dimensional configuration within the cladding material.

17. The method of claim 13, wherein a first one of the plurality of dielectric pillars is formed at a first surface of the cladding material that is different from a second surface of the cladding material on which a second one of the plurality of dielectric pillars is formed.

18. The method of claim 13, wherein each of the plurality of dielectric pillars and each of the plurality of dielectric caps comprise a polymer material that is transparent to infrared radiation.

19. The method of claim 13, wherein forming the plurality of dielectric pillars further comprises:

forming a layer of a radiation-curable polymer over the surface of the cladding material; and irradiating the radiation-curable polymer in localized regions over the surface of the cladding material to form the plurality of dielectric pillars comprising cured regions of the radiation-curable polymer.

20. The method of claim 13, wherein each of the plurality of dielectric caps is configured such that radiation incident on the dielectric cap from a respective one of the plurality of dielectric waveguides is focused by the dielectric cap to a beam width that is smaller than a width of the respective core portion.

* * * * *